United States Patent [19]
Kano et al.

[11] Patent Number: 5,627,397
[45] Date of Patent: May 6, 1997

[54] SEMICONDUCTOR ACCELERATION SENSOR WITH SOURCE AND DRAIN REGIONS

[75] Inventors: Kazuhiko Kano, Obu; Yukihiro Takeuchi, Seto; Takamoto Watanabe, Nagoya; Kenichi Ao, Tokai; Masakazu Kanosue, Nagoya; Hirofumi Uenoyama, Anjo; Kenichi Nara, Obu, all of Japan

[73] Assignee: Nippondenso Co., Ltd., Kariya, Japan

[21] Appl. No.: 402,949

[22] Filed: Mar. 13, 1995

[30] Foreign Application Priority Data

Mar. 15, 1994 [JP] Japan .................................. 6-044354
Feb. 10, 1995 [JP] Japan .................................. 7-023162

[51] Int. Cl.⁶ ................................... H01L 29/82
[52] U.S. Cl. ............... 257/417; 257/418; 257/420; 73/514.21; 73/514.22; 73/514.23; 73/514.36; 73/514.37; 73/514.16; 73/DIG. 1
[58] Field of Search ................... 257/417, 418, 257/419, 420; 73/514.15, 514.21, 514.22, 514.23, 514.29, 514.36, DIG. 1, 514.37, 514.16

[56] References Cited

U.S. PATENT DOCUMENTS

| | | | |
|---|---|---|---|
| 5,016,072 | 5/1991 | Greiff | 257/420 X |
| 5,103,279 | 4/1992 | Guheridge | 257/417 X |
| 5,126,812 | 6/1992 | Greiff | 257/420 X |

FOREIGN PATENT DOCUMENTS

| | | |
|---|---|---|
| 194953 | 4/1990 | European Pat. Off. . |
| 2134570 | 5/1990 | Japan . |
| 425764 | 1/1992 | Japan . |
| 9203740 | 3/1992 | WIPO . |

OTHER PUBLICATIONS

Dunn, et al: "Automotive Silicon Sensor Integration", SAE Technical Paper Series, 920471, pp. 1–6, Feb. 1992.
Payne, et al: "Surface Micromachined Accelerometer: A Technology Update", SAE, 910496, Feb. 25, 1991, pp. 127–135.
Nathanson, et al: "The Resonant Gate Transistor", IEEE Transactions on Electron Devices, vol. ED–14, No. 3, Mar. 1967 pp. 117–133.
Nathanson, et al: "A Resonant–Gate Silicon Surface Transistor with High–Q Band–Pass Properties", Applied Physics Letters, vol. 7, No. 4, Aug. 15, 1965–pp. 84–86.

*Primary Examiner*—William Mintel
*Attorney, Agent, or Firm*—Cushman Darby & Cushman IP Group of Pillsbury Madison & Sutro LLP

[57] ABSTRACT

A semiconductor acceleration sensor according to the present invention performs acceleration detection by means of detecting increase or decrease in electrical current flowing between fixed electrodes formed on a semiconductor substrate taking a movable section in a movable state supported on the semiconductor substrate as a gate electrode. Two transistor structures are utilized in this detection. Current between fixed electrodes in one transistor structure increases when the movable section is subjected to acceleration and is displaced. At that time, current between fixed electrodes in the other transistor structure decreases. These two transistor structures are disposed proximately. By means of this proximate disposition, fluctuations in characteristics of both transistors are reduced, and by means of acceleration detection by differential type, temperature characteristics of the two transistors can be canceled favorably.

14 Claims, 22 Drawing Sheets

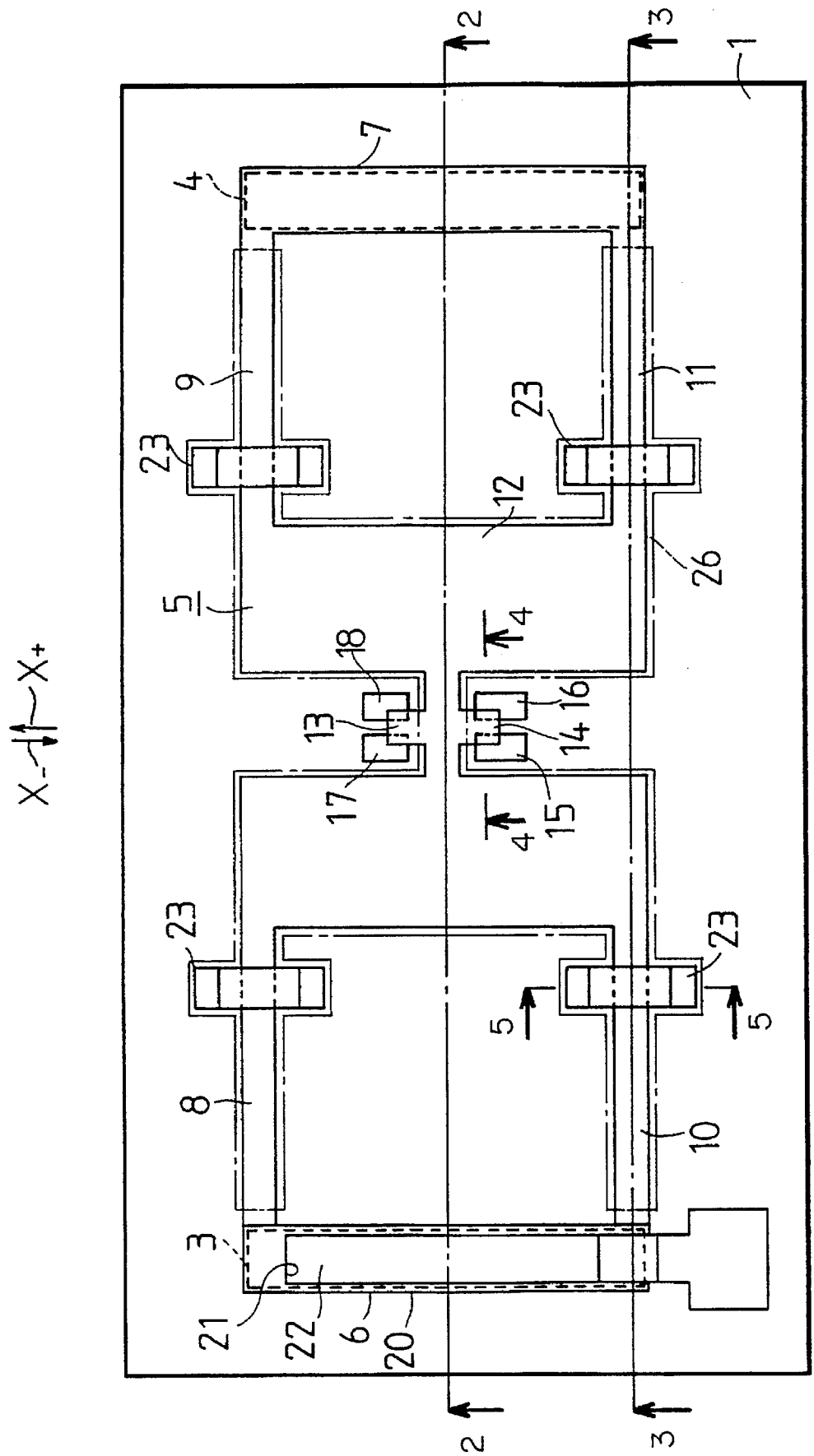

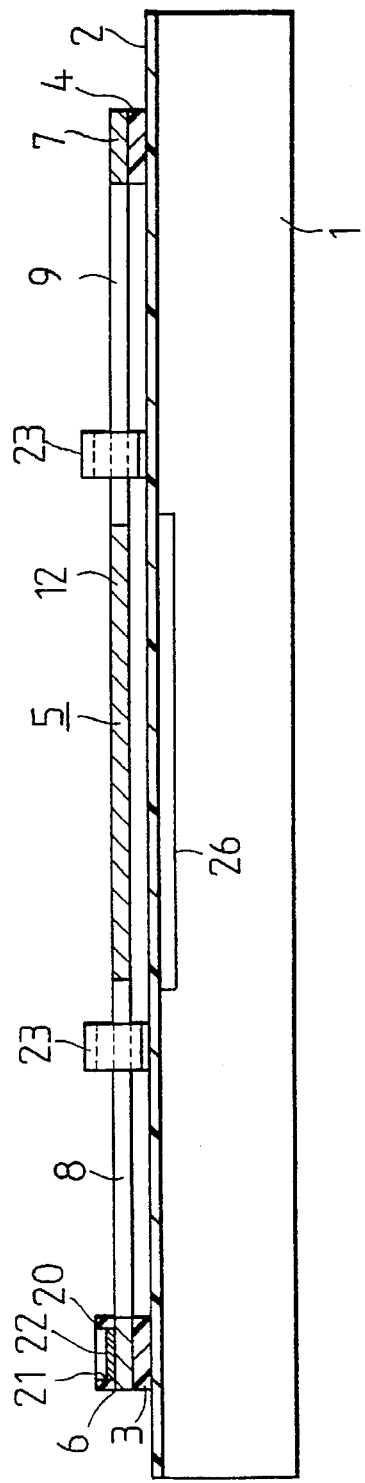
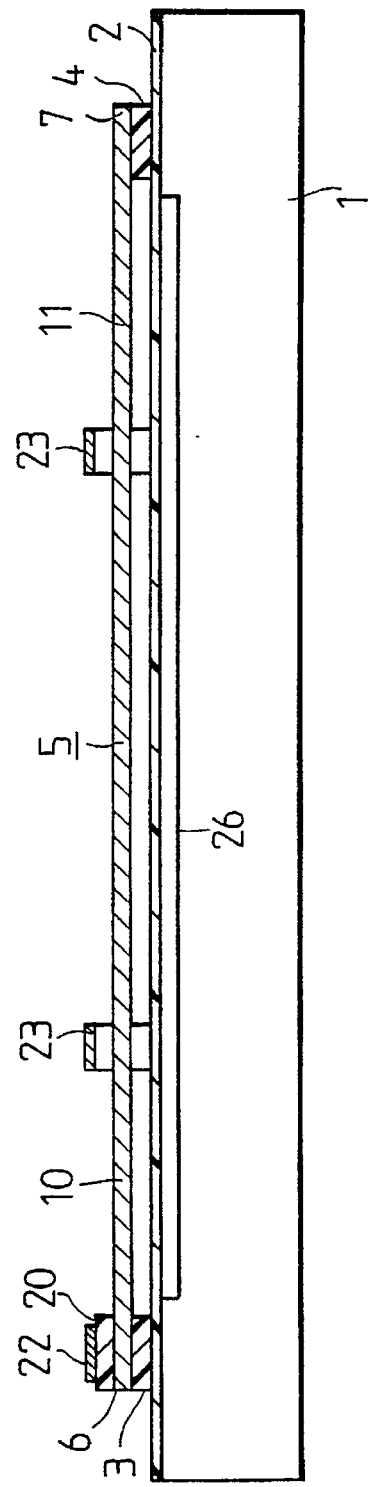

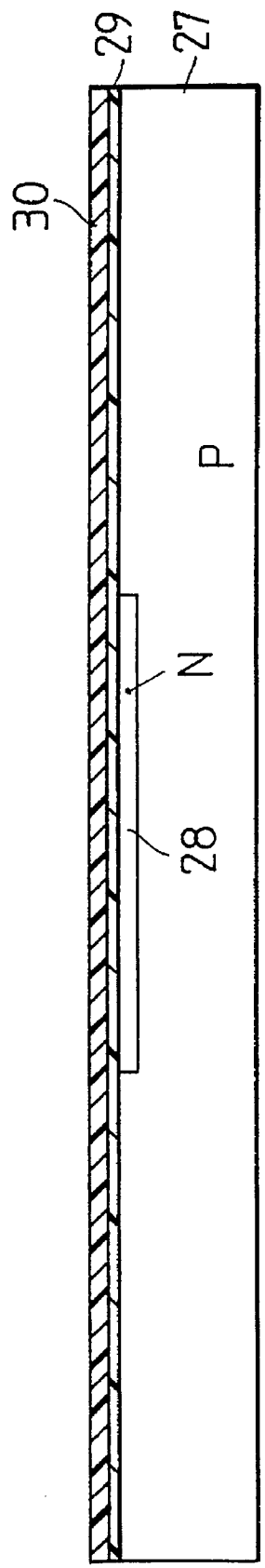
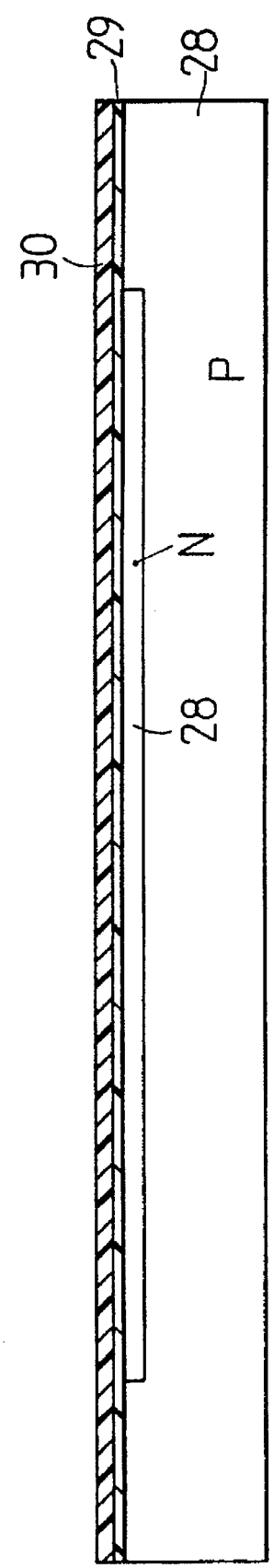

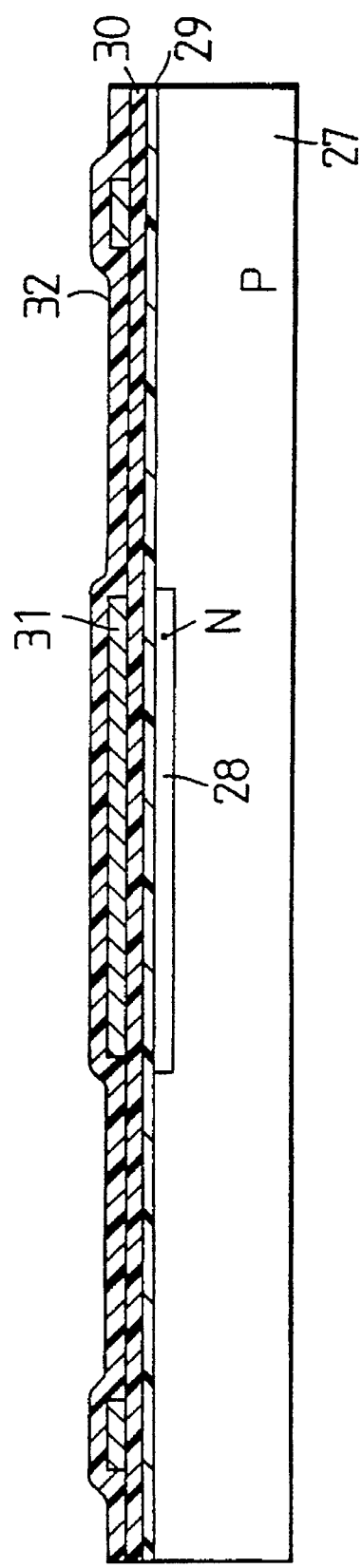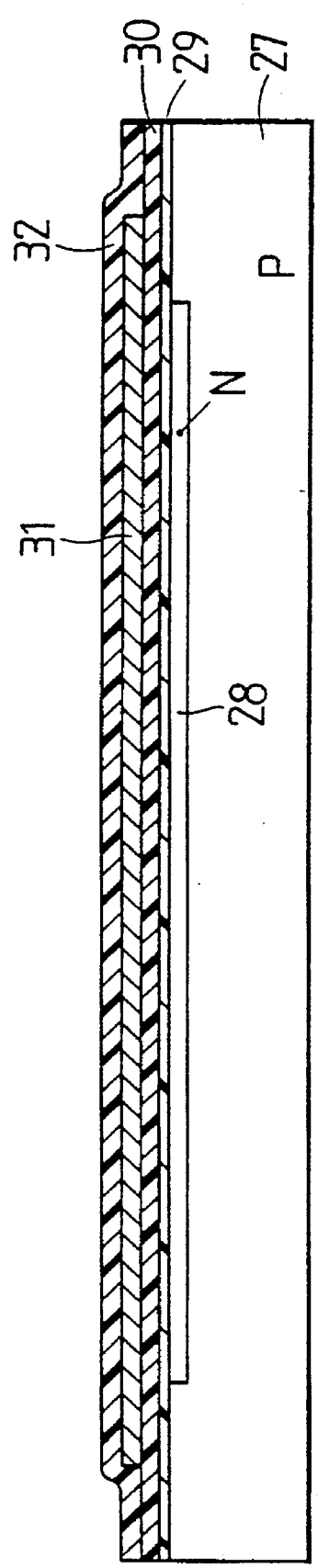

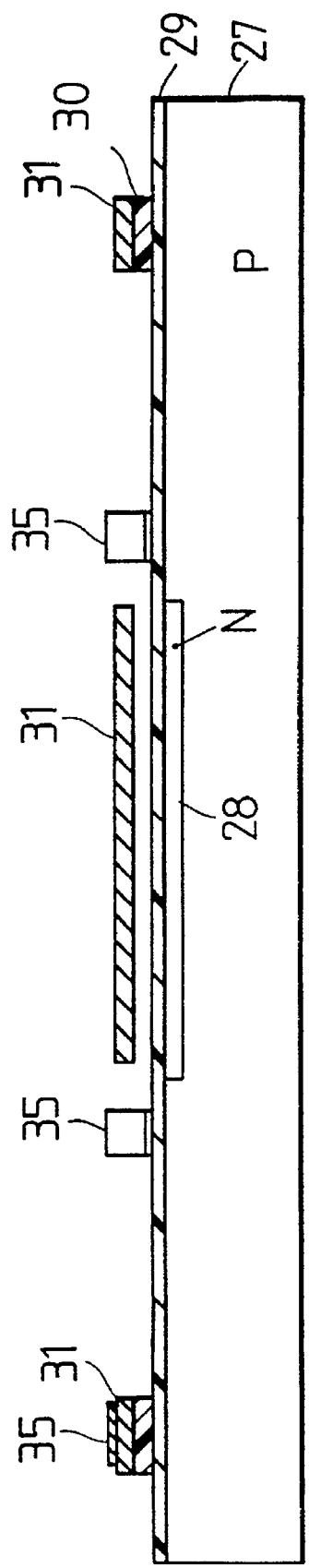
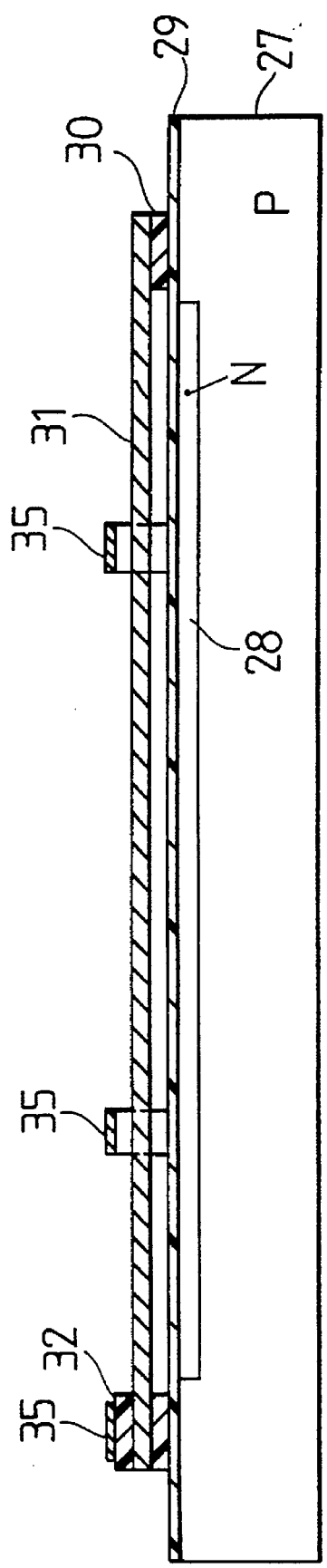
FIG. 12A
FIG. 12B

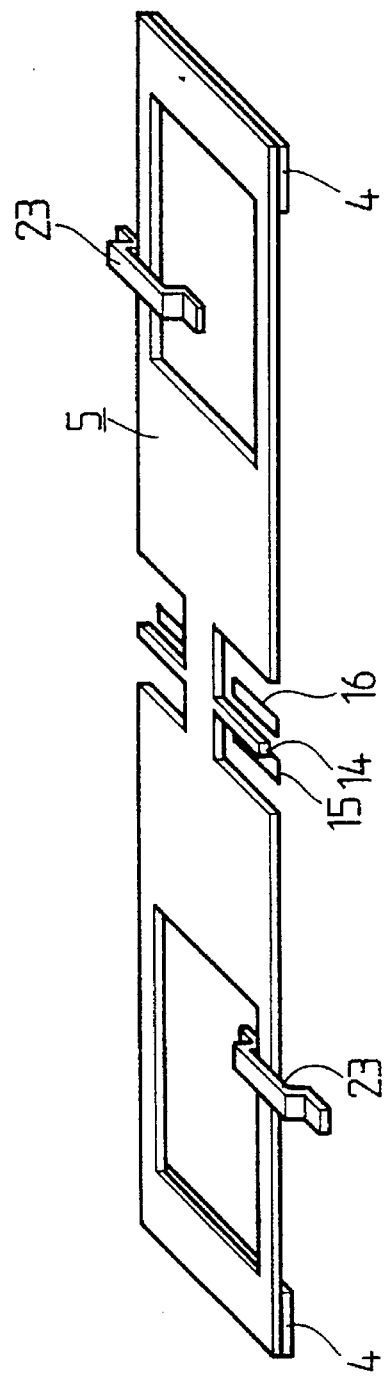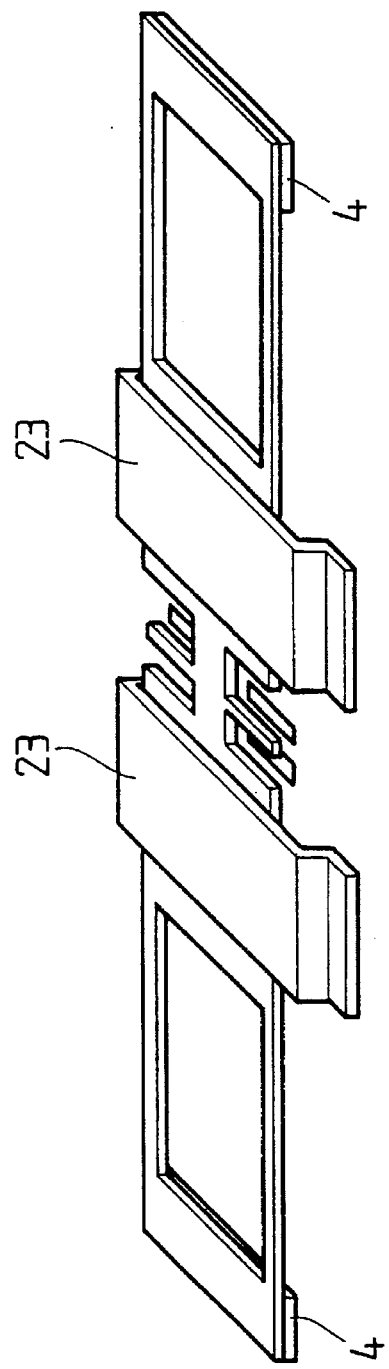

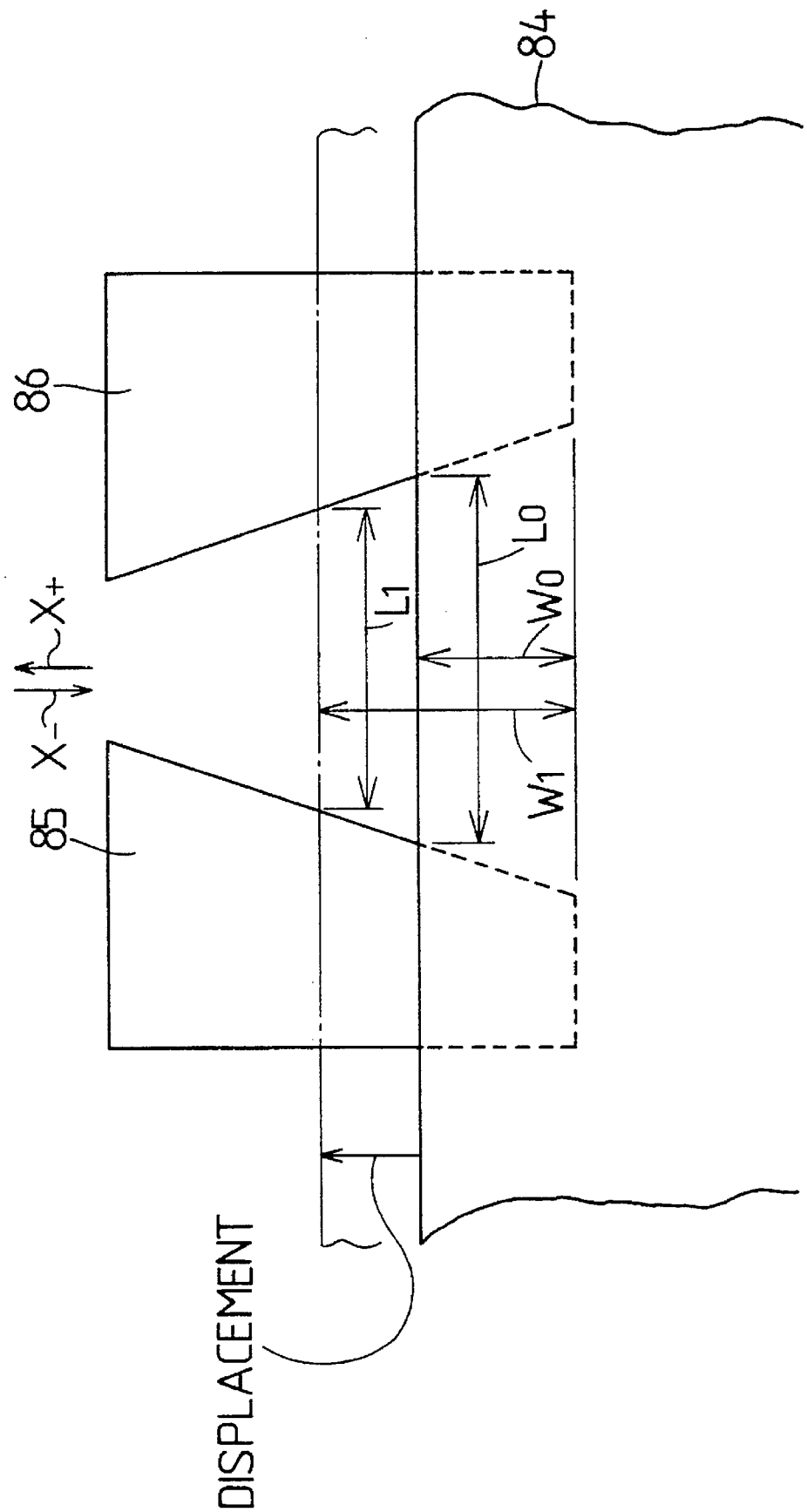

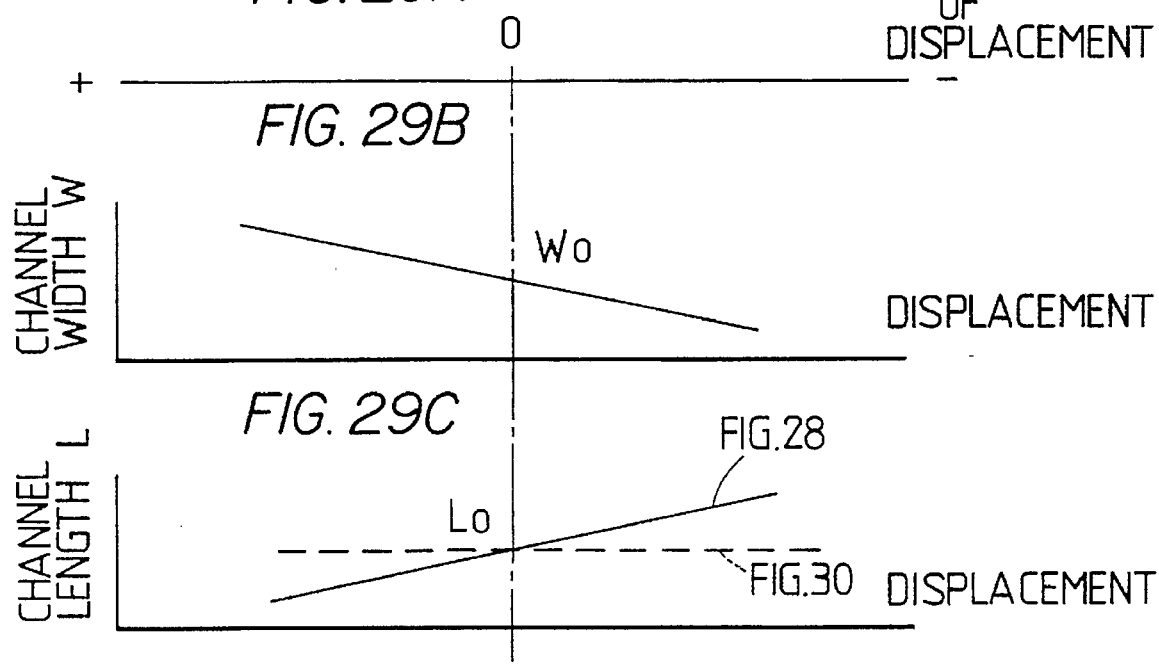
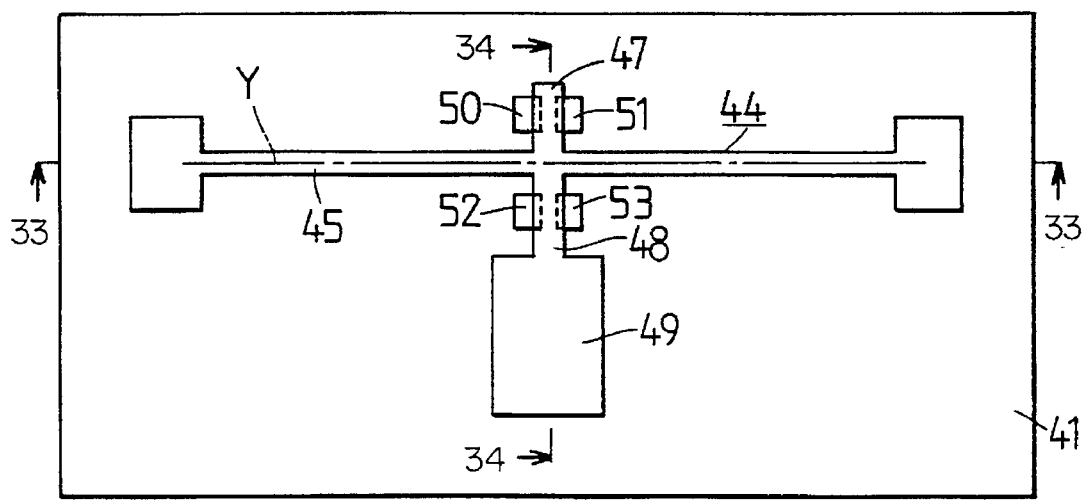

1

SEMICONDUCTOR ACCELERATION SENSOR WITH SOURCE AND DRAIN REGIONS

CROSS REFERENCE TO RELATED APPLICATION

This application is based upon and claims the benefit of priority of the prior Japanese Patent applications No. 6-44354 filed on Mar. 15, 1994 and No. 7-23162 filed on Feb. 10, 1995, the contents of which are incorporated herein by reference.

BACKGROUND OF THE INVENTION

1. Field of the Invention

The present invention relates to a semiconductor acceleration sensor. More specifically, the present invention relates to a MISFET (metal-insulator-semiconductor field-effect transistor) type semiconductor acceleration sensor.

2. Related Arts

In an acceleration sensor for automotive use according to the related art, semiconductor acceleration sensors which can detect low acceleration levels and low frequency levels with good accuracy have been considered well suited to volume production at low cost. Among these there exists an electrostatic capacitance type acceleration sensor disclosed in Japanese Patent Application Laid-open No. 2-134570 and a MISFET type acceleration sensor disclosed in Japanese Patent Application Laid-open No. 4-25764. Both sensors are capable of detecting low acceleration levels and low frequency levels with good accuracy and suited to volume production at low cost. Of these, the latter MISFET type acceleration sensor in particular is considered promising as a sensor having a smaller size. FIGS. 37 and 38 illustrate a MISFET type acceleration sensor disclosed in Japanese Patent Application Laid-open No. 4-25764. Herein, when a gate electrode 93 maintained on an acceleration detection substrate 91 moves up or down in accompaniment to an acceleration, the carrier concentration of a channel region formed within a p-type silicon substrate 92 changes, and fluctuation in an amount of current flowing between a source and a drain is used to detect acceleration. In this drawing, 94 is a cantilever, 95 is a source electrode, 96 is a drain electrode, 97 is a trench, 98, 99, and 100 are wires, and 101 is a package.

However, in a MISFET type acceleration sensor according to FIGS. 37 and 38, the cantilever 94 installed on the gate electrode 93 is maintained on the acceleration detection substrate 91 by means of one beam section. If the beam section is twisted, detection errors increase. That is to say, for an electrostatic capacitance type acceleration sensor, which is structured such that a movable electrode which detects acceleration is installed between two electrodes, and even if the movable electrode is twisted, the change thereof is canceled out and no problem exists. However, if twisting of the movable electrode occurs in a MISFET type acceleration sensor, detection error and faulty operation are caused.

SUMMARY OF THE INVENTION

It is an object of the present invention to provide a MISFET type semiconductor acceleration sensor which does not cause detection error or faulty operation even if twisting to the movable electrode occurs.

For this reason, a semiconductor acceleration sensor according to the present invention has a basic structure which will be described hereinafter. That is to say, it has a semiconductor substrate, a movable section suspended in a movable state with a predetermined gap interposed therebetween above the semiconductor substrate, the movable section comprising a weight section which receives an acceleration to be detected and is displaced as a result of the acceleration, a beam section having a doubly supported structure which connects the weight section to the semiconductor substrate, first and second gate electrode sections which are displaced in a direction parallel to the displacement direction of the weight section, and first and second source/drain diffusion regions disposed on the surface of the semiconductor substrate in correspondence to the respective first and second gate electrode sections.

Herein, the first and second gate electrode sections and the corresponding first and second source/drain regions form respective first and second field-effect transistors, and the electrical currents flowing through the first and second field-effect transistors are mutually reversed in phase in accordance to the displacement of the weight section. Additionally, the first and second field-effect transistors are disposed in mutually proximal locations.

Specifically, the first and second field-effect transistors are disposed in mutually proximate locations which can regard the effects on the first and second field-effect transistors due to twisting as being generated to an equal extent even in a case where twisting occurring in the movable section.

According to the structure of the present invention, by making the beam a doubly supported structure, twisting of the movable section is minimized. Moreover, by making the locations of the first and second field-effect transistors mutually proximate, even if twisting is exerted, the influence thereof is equivalent for both transistors, and cancellation is also possible.

Additionally, proximal disposition of the first and second field-effect transistors can also obtain, secondary, minor benefits. A semiconductor acceleration sensor of this type causes the movable section to be in a movable state, and is fabricated through steps that include sacrificial film formation, movable section film formation on the sacrificial film, and sacrificial film etching. If both transistors are spaced apart in terms of distance at this time, and if there is occurrence of nonuniformity in the film thickness of the sacrificial film due to factors in the fabrication steps or a fluctuation in the concentration distribution of the substrate surface or crystalline defect distribution due to fluctuation in step conditions, the characteristics of both transistors fluctuate because of the influence thereof, and mutual compensation of characteristics becomes difficult. If, on the other hand, both transistors are disposed proximately as in the present invention, the difference of characteristic fluctuation between the two transistors can be reduced to an extent that is negligible.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 1 is a plan view of a semiconductor acceleration sensor according to a first embodiment of the present invention;

FIG. 2 is a sectional view taken along lines 2—2 of FIG. 1;

FIG. 3 is a sectional view taken along line 3—3 of FIG. 1;

FIGS. 6A to 12A and FIGS. 6B to 12B are respective sectional views during the fabrication steps taken along the 2—2 and 3—3 section lines of FIG. 1;

FIGS. 20 to 26 are perspective views of a semiconductor acceleration sensor according to the first embodiment;

FIG. 28 is an enlarged view of a portion of FIG. 27;

FIGS. 29A–29C illustrate the operation of the fifth embodiment;

FIG. 32 is a plan view of a semiconductor acceleration sensor according to a sixth embodiment;

DETAILED DESCRIPTION OF THE PRESENTLY PREFERRED EXEMPLARY EMBODIMENTS

First Embodiment

A specific first embodiment according to the present invention will be described hereinafter with reference to the drawings.

Figure 5:
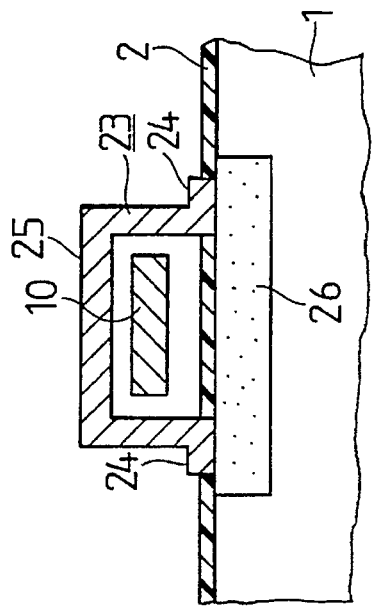
FIG. 5 is a sectional view taken along line 5—5 of FIG. 1.

FIG. 1 is a plan view of a semiconductor acceleration sensor according to this embodiment. In addition, FIG. 2 is a sectional view taken along line 2—2 of FIG. 1, FIG. 3 is a sectional view taken along line 3—3 of FIG. 1, FIG. 4 is a sectional view taken along line 4—4 of FIG. 1, and FIG. 5 is a sectional view taken along line 5—5 of FIG. 1.

A silicon nitride film 2 as a gate insulation film is formed over the entire surface of a p-type silicon substrate 1 as a semiconductor substrate. This silicon nitride film 2 reduces leakage current of the substrate surface as well as suppresses across-time deteriorations of transistor characteristics. Silicon oxide films 3 and 4 having a predetermined thickness are formed on the silicon nitride film 2. These silicon oxide films 3 and 4 form a belt configuration, and extend linearly and mutually in parallel. A movable section 5 composed of polycrystalline silicon is suspended over silicon oxide films 3 and 4. Movable section 5 is composed of anchor sections 6 and 7, beam sections 8, 9, 10, and 11, a weight section 12, and movable electrode sections 13 and 14 as gate electrodes. The beam sections 8, 9, 10, and 11, weight section 12, and movable electrode sections 13 and 14 are disposed above the silicon substrate 1 (silicon nitride film 2) with a predetermined gap interposed therebetween. The anchor sections 6 and 7 having dimensions identical to silicon oxide films 3 and 4, are disposed on the silicon oxide films 3 and 4. The beam sections 8, 9, 10, and 11 extend from the anchor sections 6 and 7, and the weight section 12, the center portion of which is of a narrowed-width configuration, is supported by the beam sections. The movable electrode sections 13 and 14 have an oblong configuration and protrude from the narrowed-width portion of the weight section 12 in mutually opposing directions. That is to say, the movable electrode sections 13 and 14 are supported by portions of the doubly supported type beam configuration (the beam sections 8, 9, 10, and 11), so as to be displaceable in a direction perpendicular to and a direction parallel to the surface of the silicon substrate 1.

Figure 4:
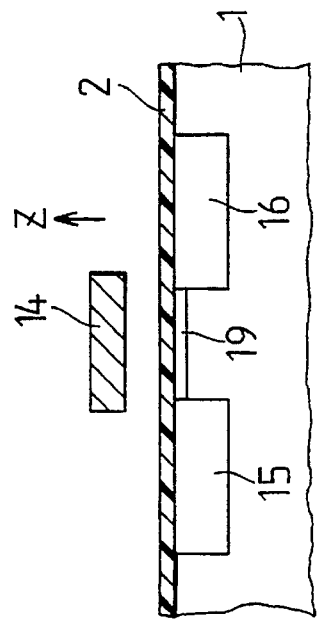
FIG. 4 is a sectional view taken along line 4—4 of FIG. 1.

As shown in FIG. 4, on the silicon substrate 1 below the movable electrode section 14 of the movable section 5 are formed fixed electrodes 15 and 16 as a source/drain portion composed of an n-type impurity diffusion region with respect to the movable electrode section 14 at both sides thereof. Similarly, as shown in FIG. 1, on the silicon substrate 1 below the movable electrode section 13 of the movable section 5 are formed fixed electrodes 17 and 18 as a source/drain portion composed of an n-type impurity diffusion region with respect to the movable electrode section 13 at both sides thereof. As shown in FIG. 4, a channel region 19 is formed between the fixed electrodes 15 and 16 on the silicon substrate 1, and this channel region 19 is produced by means of applying voltage between the silicon substrate 1 and the movable electrode section 14. Accordingly, drain current flows through this channel region 19 by applying voltage between the fixed electrodes 15 and 16. Similarly, a channel region (not illustrated) is formed between the fixed electrodes 17 and 18 on the silicon substrate 1, and this channel region is produced by means of applying voltage between the silicon substrate 1 and the movable electrode section 13. Accordingly, drain current flows through this channel region by applying voltage between the fixed electrodes 17 and 18.

An interlayer insulation film 20 is formed on the anchor section 6 of the movable section 5, and a via hole 21 is formed in this interlayer insulation film 20 (see FIGS. 1 and 2). An aluminum lead 22 is formed within this via hole 21, and electrical contact is made between the aluminum lead 22 and the movable section 5. The aluminum lead 22, as shown in FIGS. 1 and 3, extends over the interlayer insulation film 20 and moreover extends over the silicon substrate 1.

As shown in FIG. 1, bridges 23 are disposed as respective movable-range restricting members proximate to weight section 12 at the respective beam sections 8, 9, 10, and 11 of the movable section 5. As shown in FIG. 5, a bridge 23 forms a belt configuration overall, and is composed of aluminum. Additionally, a bridge is composed of anchor sections 24 and a stopper section 25. The anchor sections 24 are fixed to the silicon substrate 1, and the stopper section 25 is disposed above the perimeter of the beam sections 8, 9, 10, and 11 with a predetermined gap interposed therebetween. Accordingly, the movable range of the beam sections 8, 9, 10, and 11 is restricted by bridges 23.

Additionally, an underlying electrode 26 composed of an n-type impurity diffusion region is formed on the surface of the silicon substrate 1 in a region without the fixed electrodes 15, 16, 17, and 18 at a portion opposing the movable section 5. This underlying electrode 26 is maintained equipotentially with respect to the potential of the movable section 5, and suppresses electrostatic force generated between the silicon substrate 1 and the movable section 5. In addition, the foregoing bridges 23 are connected to the underlying electrode 26, and the underlying electrode 26 and bridges 23 are at an equipotential.

Peripheral circuitry (not illustrated) is formed in the periphery of the region of the movable section 5 on the silicon substrate 1. Accordingly, the peripheral circuitry and the aluminum lead 22 are connected, the peripheral circuitry and the fixed electrodes 15, 16, 17, and 18 are electrically connected and the peripheral circuitry and the underlying electrode 26 are electrically connected.

Operation of this semiconductor acceleration sensor will be described next.

When voltage is applied between the movable section 5 and the silicon substrate 1, and between the fixed electrodes 15 and 16 (17 and 18), the channel region 19 is formed, and current flows between the fixed electrodes 15 and 16 (17 and 18). Herein, in a case where this acceleration sensor is subjected to acceleration and the movable electrode sections 13 and 14 (movable section 5) are (is) displaced in the $X_+$ direction indicated in FIG. 1 (a direction parallel to the surface of the silicon substrate 1), by means of a change in the surface area (the channel width in transistor terms) of the channel region between the fixed electrodes, current flowing through the fixed electrodes 15 and 16 decreases, and current flowing through the fixed electrodes 17 and 18 increases. Additionally, in a case where the movable electrode sections 13 and 14 (movable section 5) are (is) displaced in the $X_-$ direction indicated in FIG. 1 (also a direction parallel to the surface of the silicon substrate 1), by means of a change in the surface area (the channel width in transistor terms) of the channel region between the fixed electrodes, current flowing through the fixed electrodes 15 and 16 increases, and current flowing through the fixed electrodes 17 and 18 decreases. Meanwhile, in a case where this acceleration sensor is subjected to acceleration and the movable electrode sections 13 and 14 are displaced in the Z direction indicated in FIG. 4 (a direction perpendicular to the surface of the silicon substrate 1), the carrier concentration of the channel region 19 is diminished because of a change in electrical field strength, and so the foregoing currents decrease simultaneously.

In this manner, this acceleration sensor can detect acceleration of two dimensions by means of the magnitude and phase of the current change when current flowing between the fixed electrodes 15 and 16 and between the fixed electrodes 17 and 18 changes due to changes in the mutual positions of the movable electrode sections 13 and 14 and the fixed electrodes 15, 16, 17, and 18 due to acceleration.

Additionally, according to this embodiment the movable electrode sections 13 and 14 are supported by doubly supported type beams, and so the movable electrode sections 13 and 14 can be maintained in parallel with respect to the silicon substrate 1. As a result, the movable electrode sections 13 and 14 and the silicon substrate 1 can be maintained in parallel even if an acceleration is applied in directions perpendicular and parallel to the substrate surface with respect to the movable electrode sections 13 and 14. Accordingly, the currents flowing through the fixed electrode sections 15 to 18 can be made to be the desired values, and acceleration detection can be performed extremely accurately.

In addition, as described above, according to this embodiment, accelerations in the $X_+$ and $X_-$ directions parallel to the surface of the silicon substrate 1 are detected with a differential type detection method. For the two currents (the one increasing and the other decreasing) flowing between the fixed electrodes, the current values thereof have idiosyncratic characteristics (offset components). This offset component arises, for example, from the temperature characteristics of channel resistance and relative distance between the channel region and the movable electrode section (gate electrode). According to this embodiment, the transistor created by the fixed electrodes 17 and 18 and the movable electrode 13 and the transistor created by the fixed electrodes 15 and 16 and the movable electrode 14 are disposed proximate to one another. Consequently, even if impurity concentration distribution of the substrate surface or distribution of crystalline defects fluctuates within the substrate, the difference of fluctuation between the two transistors is small. Additionally, even if the film thickness of the sacrificial layer, which will be described below, fluctuates within the surface, the fluctuation between the two transistor locations is small. That is to say, by proximately disposing the two transistors, the difference of fluctuation of characteristics between these two transistors can be made small, and the above-described offset components are mutually compensated in the characteristics of the two transistor, and good cancellation is possible thereby. Consequently, limitation in a detection circuit side can be made small. If the two transistors are separated and spaced apart, structuring of transistors having identical characteristics is difficult because of the various factors described above.

In addition, the movable range of the movable section 5 can be restricted by means of providing bridges 23. Consequently, even if a large force (acceleration) is applied suddenly, not only in a direction parallel to the substrate surface but also in a direction perpendicular with respect to the movable section 5, there is no breakage or bending of the beam sections 8 to 11. Accordingly, durability of the sensor is excellent, and accurate acceleration detection, which is constantly stabilized, can be performed.

Next, a method of fabrication of an acceleration according to this embodiment will be described referring to FIGS. 6A and 6B through FIGS. 12A and 12B. Further, FIGS. 6A to 12A indicate sectional configurations during the fabrication steps at the sectional view taken along line 2—2 of FIG. 1, and FIGS. 6B to 12B indicate sectional configurations during the fabrication steps at the sectional view of FIG. 1 taken along line 3—3.

Figure 6A:
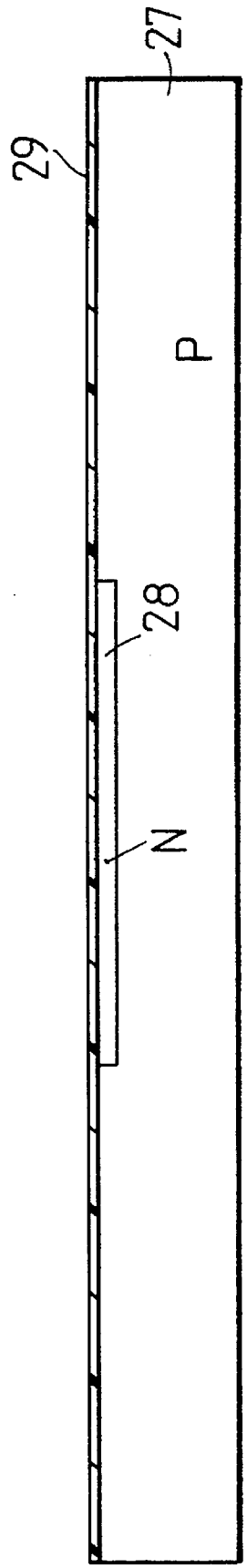
Figure 6B:
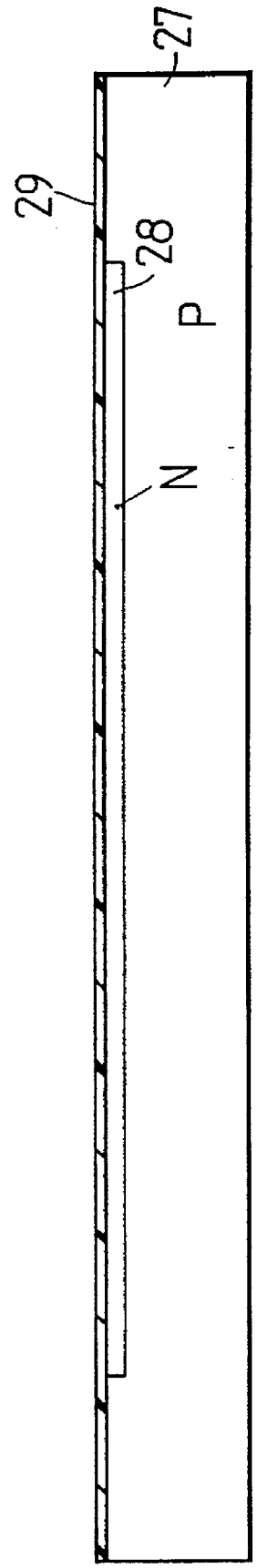
Figure 8A:
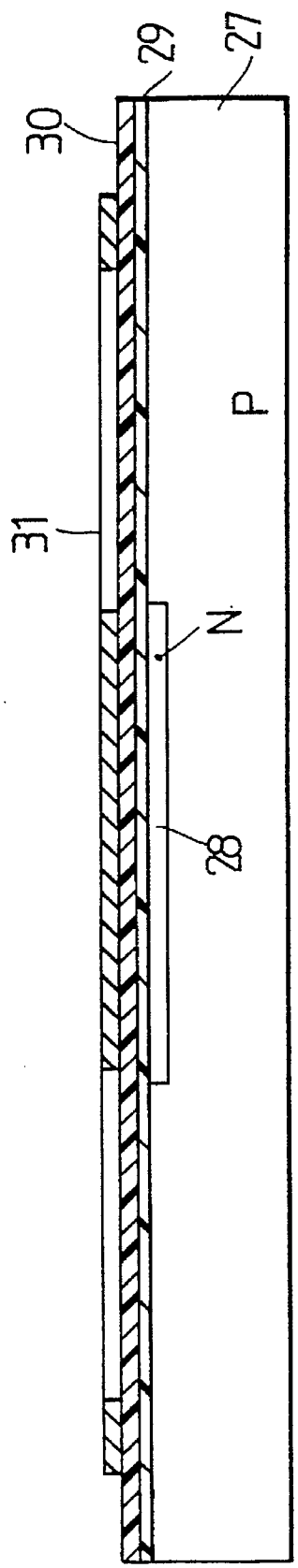
Figure 8B:
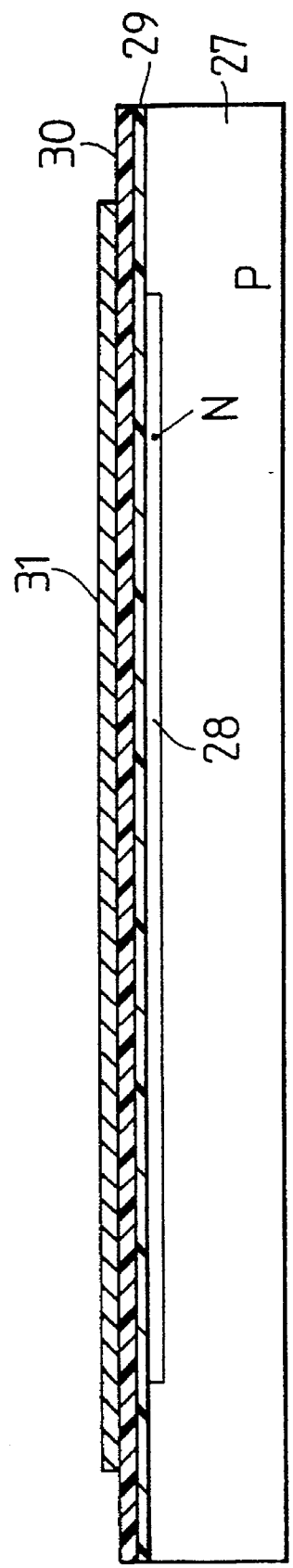

First, as shown in FIGS. 6A and 6B, a p-type silicon substrate 27 is prepared and on a predetermined region of the surface thereof, are formed an underlying electrode 28 composed of an n-type impurity diffusion region as well as fixed electrodes 15, 16, 17, and 18 composed of the impurity diffusion region indicated in FIG. 1. Along with this, a silicon nitride film 29 is formed on the entire surface of the silicon substrate 27. As shown in FIGS. 7A and 7B, a silicon oxide film 30 is deposited on the entire surface of the silicon substrate 27. Furthermore, as shown in FIGS. 8A and 8B, a polycrystalline silicon thin film, which will become a movable section 31, is deposited on the entire surface of the silicon substrate 27 and is patterned to the predetermined configuration (see FIG. 1).

Figure 10A:
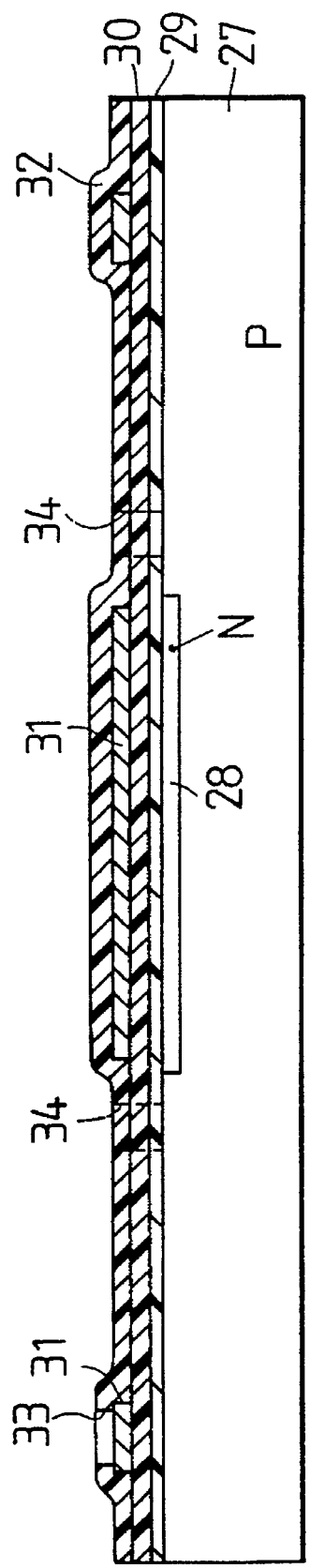
Figure 10B:
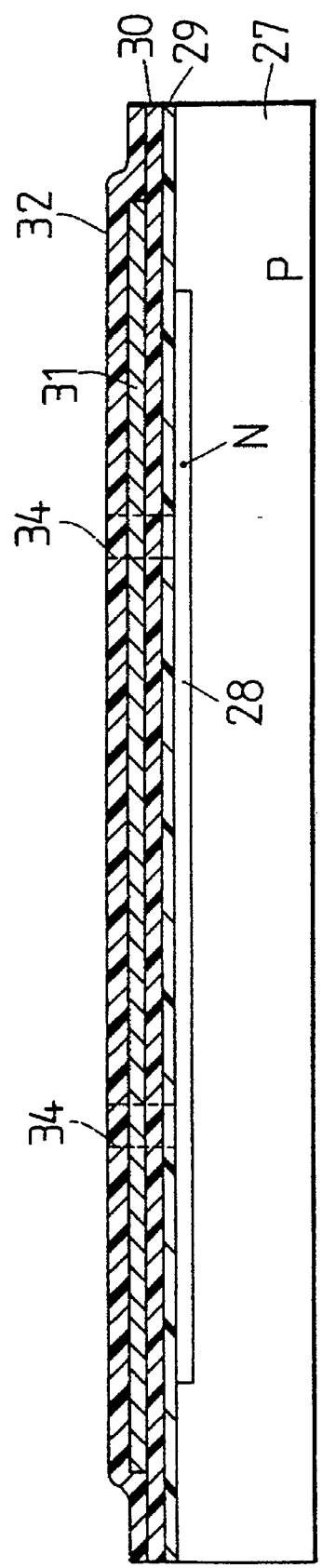

To continue, as shown in FIGS. 9A and 9B, an interlayer insulation film 32 composed of PSG or the like is deposited on the entire surface of the silicon substrate 27. As shown in FIGS. 10A and 10B, a hole 33 is formed at a contact area to the movable section 31 on the interlayer insulation film 32 and, along with this, holes 34 are formed in the interlayer insulation film, silicon oxide film 30, and silicon nitride film 29 on the bridge formation area. In addition, holes (not illustrated) are also formed at the contact areas (not illustrated) corresponding to the fixed electrodes 15 to 18 and at the contact area (not illustrated) corresponding to the underlying electrode 28.

Figure 11A:
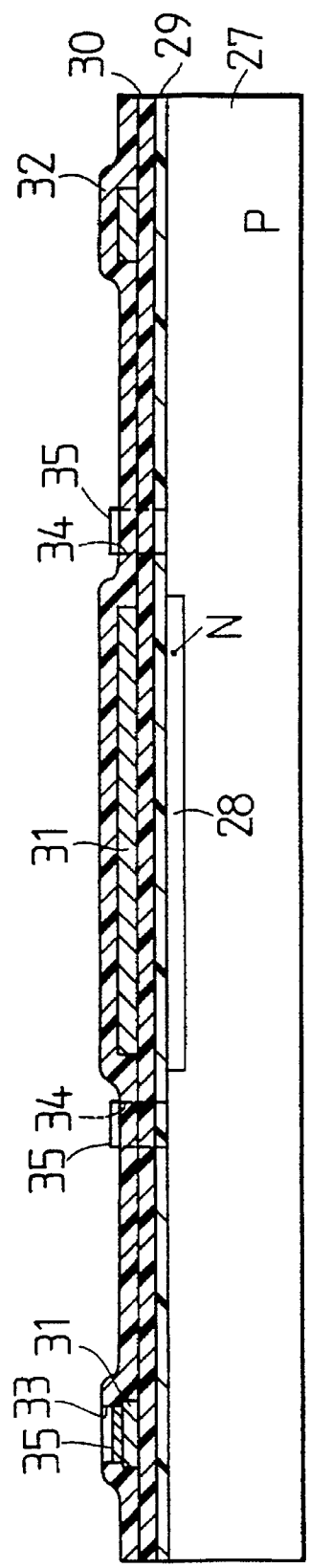
Figure 11B:
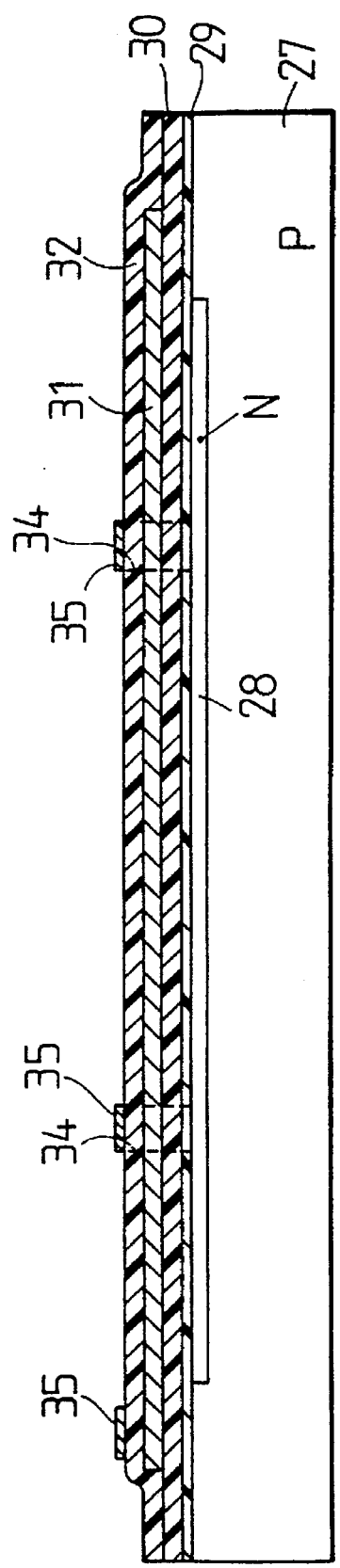

Furthermore, as shown in FIGS. 11A and 11B, an aluminum thin film 35, which will become the gate electrode wire 22 and bridges 23 indicated in FIG. 1, is deposited on the interlayer insulation film 32 including holes 33 and 34 and patterned to the predetermined configuration. At this time, another lead region (not illustrated) is also formed. As shown in FIGS. 12A and 12B, the silicon oxide film 30 and interlayer insulation film 32 are etched away as sacrificial layers, allowing the silicon oxide film 30 and interlayer insulation film 32 of predetermined regions to remain. At this time, as shown in FIG. 5, the silicon oxide film 30 and interlayer insulation film 32, both of which are disposed between the beam sections 8, 9, 10, and 11 and the bridges 23, is etched, and a space is formed between the beam sections 8, 9, 10, and 11 and the bridges 23. The silicon oxide film 30 under the movable section 31 is also etched away as a sacrificial layer at this time. As a result of this, the movable section assumes a movable state as shown in FIGS. 2 and 3, and the semiconductor acceleration sensor indicated in FIG. 1 is fabricated.

According to this embodiment, the movable range of the movable section 5 is restricted by means of providing the bridges 23, as described above. Accordingly, if the acceleration range is normal, operation is as a normal acceleration sensor. Additionally, even in a case where excessive force (acceleration) is applied by means of a drop or the like during fabrication, the movable section 5 attempts excessive deformation due to the shock force thereof, but the excessive deformation is suppressed by means of the bridges 23 in the directions both parallel and perpendicular to the substrate surface, and destruction of the beam sections 8, 9, 10, and 11 due to excessive force (acceleration) is avoided.

Moreover, because the lead 22 of the movable electrode sections 13 and 14 and the bridges 23 are formed simultaneously of an identical material (aluminum), the bridges 23 can be formed easily without an increase in processes.

Additionally, according to the first embodiment, the lead of the movable electrode sections (gate electrode sections) 13 and 14 and the bridges (movable-range restricting members) 23 are formed simultaneously using an identical material, but it is also acceptable to form the leads of the fixed electrodes (source/drain regions) 15, 16, 17, 18 and the bridges simultaneously using an identical material, or to form the lead of the movable electrode sections 13 and 14, the leads of the fixed electrodes 15, 16, 17, 18, and the bridges 23 simultaneously using identical material.

Second Embodiment

Next, a second embodiment will be described focusing on points of difference from the first embodiment.

Figure 13:
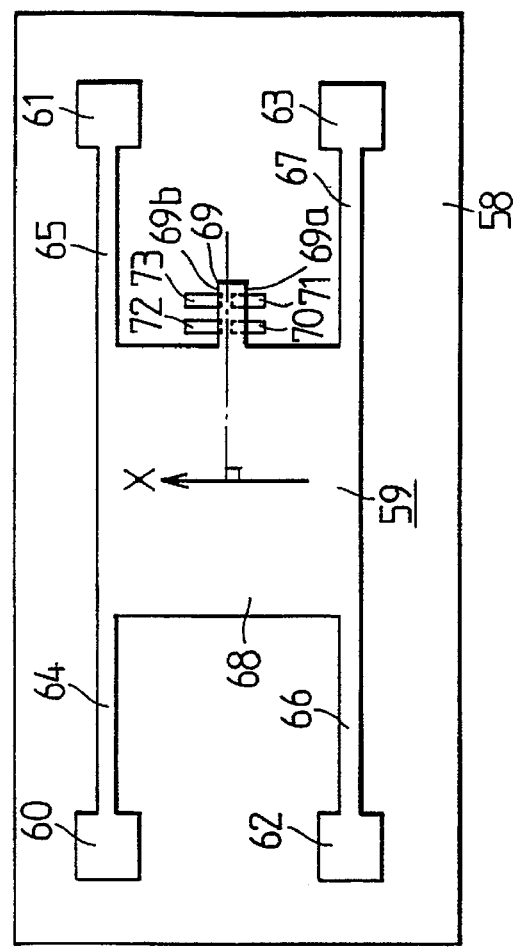
FIG. 13 is a plan view of a semiconductor acceleration sensor according to a second embodiment.

FIG. 13 indicates a plan view of a semiconductor acceleration sensor according to this embodiment.

A movable section 59 is formed on a p-type silicon substrate 58 as a semiconductor substrate. The movable section 59 is composed of anchor sections 60, 61, 62, and 63, beam sections 64, 65, 66, and 67, a weight section 68, and a movable electrode section 69 as a gate electrode section. The anchor sections 60, 61, 62, and 63 protrude upwardly from the silicon substrate 58, and the beam sections 64, 65, 66, and 67 extend from the anchor sections 60, 61, 62, and 63. The weight section 68 having a square configuration is supported by beam sections 64, 65, 66, and 67. The movable section 59 is such that it can be displaced in the respective directions perpendicular to and parallel to the substrate surface. In FIG. 13, the direction indicated by X corresponds to the displacement direction of the movable section 59 (movable electrode section 69) parallel to the substrate surface, that is, the acceleration detection direction. The movable electrode section 69 having a belt configuration extends from the weight section 68 in a direction at right angles to this acceleration detection direction X. The beam sections 64, 65, 66, 67, the weight section 68, and the movable electrode section 69 are disposed in a state above the silicon substrate 58 with a predetermined gap interposed therebetween.

Meanwhile, fixed electrodes 70 and 71, as a first source/drain region composed of an n-type impurity diffusion region, are aligned with a predetermined distance (channel length in transistor terms) interposed therebetween in a direction at right angles to the acceleration detection direction X on the silicon substrate 58 below an end surface 69a on the movable electrode section 69 of the movable section 59. Movable electrodes 70 and 71 form an oblong configuration and extend in the acceleration detection direction X. Similarly, fixed electrodes 72 and 73, as a second source/drain region composed of an n-type impurity diffusion region, are aligned with a predetermined distance (channel length) interposed therebetween in a direction at right angles to the acceleration detection direction X on the silicon substrate 58 below an end surface 69b on the movable electrode section 69 of the movable section 59. Movable electrodes 72 and 73 form an oblong configuration and extend in the acceleration detection direction X.

The operation of this semiconductor acceleration sensor will be described next.

If the acceleration sensor is subjected to an acceleration, the movable electrode section 69 (movable section 59) is displaced in the X direction indicated in FIG. 13 (a direction parallel to the surface of the silicon substrate 1). As a result, the surface area (the channel width in transistor terms) of the channel region between the fixed electrodes 72 and 73 increases, and current flow through the fixed electrodes 72 and 73 increases. Meanwhile, the surface area (the channel width in transistor terms) of the channel region between the fixed electrodes 70 and 71 decreases, and current flow through the fixed electrodes 70 and 71 decreases. In this manner, the current flowing through the fixed electrodes 72 and 73 and the current flowing through the fixed electrodes 70 and 71 change in reverse phase.

Additionally, in a case where this acceleration sensor is subjected to acceleration and the movable electrode section 69 (movable section 59) is displaced in a direction perpendicular to the surface of the substrate 58, the carrier concentration of the channel region is diminished, and so the drain currents of both transistors decrease simultaneously.

In this manner, according to this embodiment, two source/drain regions (fixed electrodes 70 and 71 and fixed electrodes 72 and 73) for the purpose of detecting an acceleration in a direction parallel to the surface of the silicon substrate 58 by a differential type are disposed proximate to one another. As a result of this, fluctuations in the characteristics between the two transistors are minimized, and limitation at the detection circuit side can be reduced. That is to say, similar to the first embodiment indicated in FIG. 1, fluctuation of transistor characteristics arising from fluctuations in the impurity concentration distribution or in the distribution of crystalline defects of the substrate, or even in the film thickness of the sacrificial layer within the surface, is avoided by means of disposing the two source/drain regions (fixed electrodes 70 and 71 and fixed electrodes 72 and 73) proximate to one another.

Figure 14:
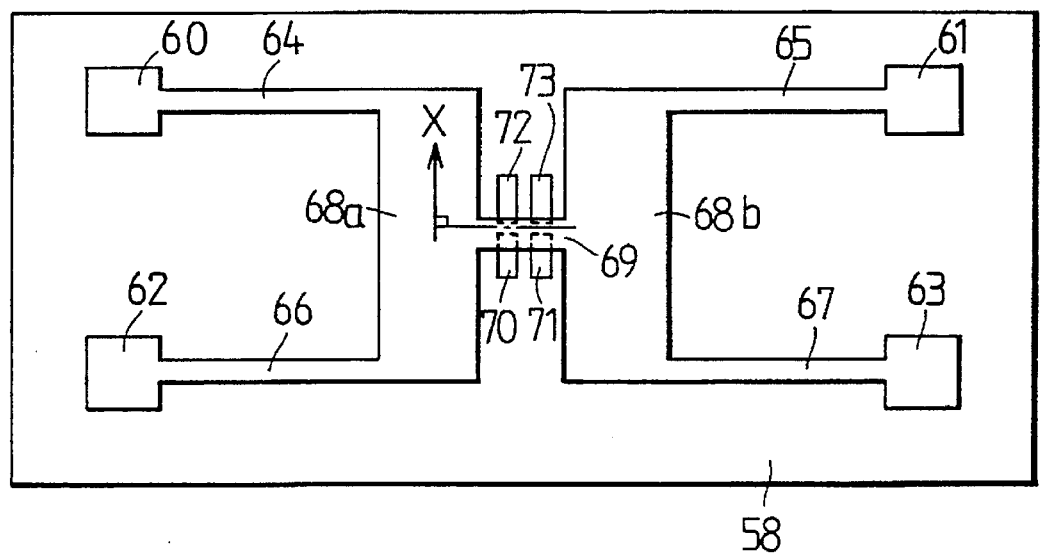
FIG. 14 is a plan view of a semiconductor acceleration sensor according to another example.

FIG. 14 indicates a sample application according to this embodiment. The weight section is divided into a first weight section 68a and a second weight section 68b, and both weight sections 68a and 68b are interconnected by the movable electrode section 69 having a belt configuration. The two source/drain regions (fixed electrodes 70 and 71 and fixed electrodes 72 and 73) are disposed proximate to one another on the silicon substrate 58 below the movable electrode section 69. Similar effects can be obtained with this embodiment as well.

Third Embodiment

Next, a third embodiment will be described with a focus on points of difference from the second embodiment.

Figure 15:
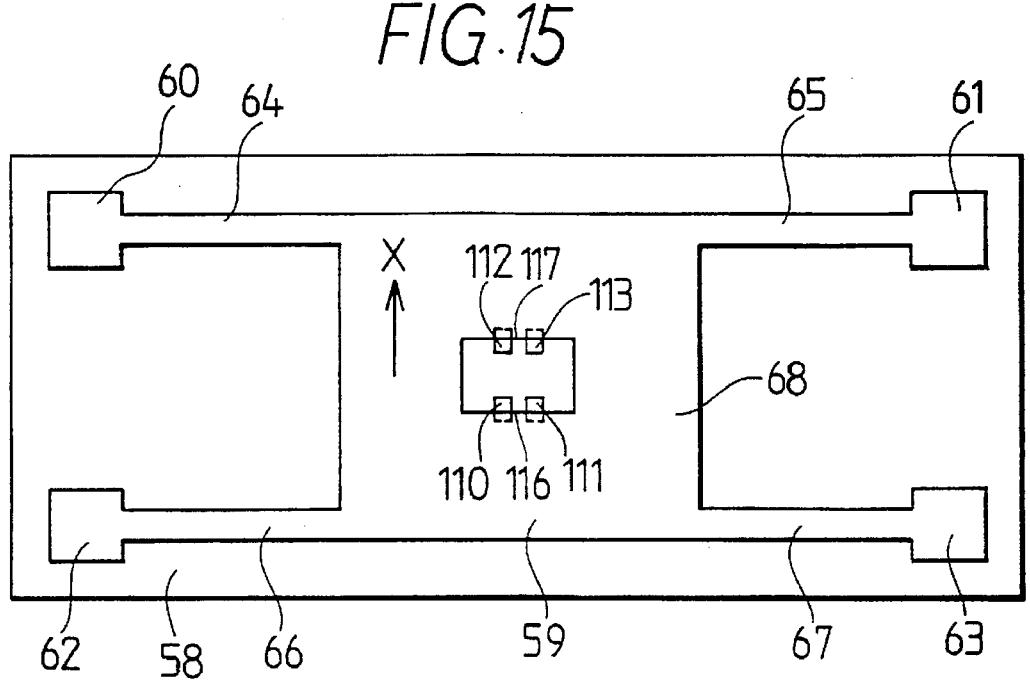
FIG. 15 is a plan view of a semiconductor acceleration sensor according to a third embodiment.

FIG. 15 indicates a plan view of a semiconductor acceleration sensor according to this embodiment.

A movable section 59 is formed on a p-type silicon substrate 58 as a semiconductor substrate. The movable section 59 is composed of anchor sections 60, 61, 62, and 63, beam sections 64, 65, 66, and 67, a weight section 68, and movable electrode sections 116 and 117 composed of an end surface of a weight section disposed in parallel to the X direction by means of gouging the weight section 68. The anchor sections 60, 61, 62, and 63 are disposed on the silicon substrate 58, and the beam sections 64, 65, 66, and 67 extend from the anchor sections 60, 61, 62, and 63. The weight section 68 having a square configuration is supported by beam sections 64, 65, 66, and 67. The movable section 59 is such that it can be displaced in the respective directions perpendicular to and parallel to the substrate surface. In FIG. 15, the direction indicated by X becomes the displacement direction of the movable section 59 (movable electrode section 69) parallel to the substrate surface, that is, the acceleration detection direction. The pair of movable electrode sections 116 and 117 of cantilever configuration opposing the inner side of the weight section 68 are formed in a direction at right angles to this acceleration detection direction X. The beam sections 64, 65, 66, 67, the weight section 68, and the movable electrode sections 116 and 117 are disposed in a state above the silicon substrate 58 with a predetermined gap interposed therebetween.

Meanwhile, fixed electrodes 110 and 111, as a first source/drain region composed of an n-type impurity diffusion region, are aligned with a predetermined distance (channel length) interposed therebetween in a direction at right angles to the acceleration detection direction X on the silicon substrate 58 below an end surface on the movable electrode section 116 of the movable section 59. These fixed electrodes 110 and 111 form an oblong configuration and extend in the acceleration detection direction X. Similarly, fixed electrodes 112 and 113, as a second source/drain region composed of an n-type impurity diffusion region, are aligned with a predetermined distance (channel length) interposed therebetween in a direction at right angles to the acceleration detection direction X on the silicon substrate 58 below another end surface on the movable electrode section 117 of the movable section 59. These fixed electrodes 112 and 113 form an oblong configuration and extend in the acceleration detection direction X.

According to this embodiment as well, the currents flowing between the respective fixed electrodes (source/drain) of the transistors accompanying application of acceleration of the X direction are reversed in phase, such that if one drain current increases, the other decreases. The two transistors for the purpose of detecting acceleration in a direction parallel to the surface of the silicon substrate 58 by a differential type are disposed proximately.

Consequently, according to this embodiment as well, there is no large fluctuation difference of the characteristics between the two transistors.

Figure 16:
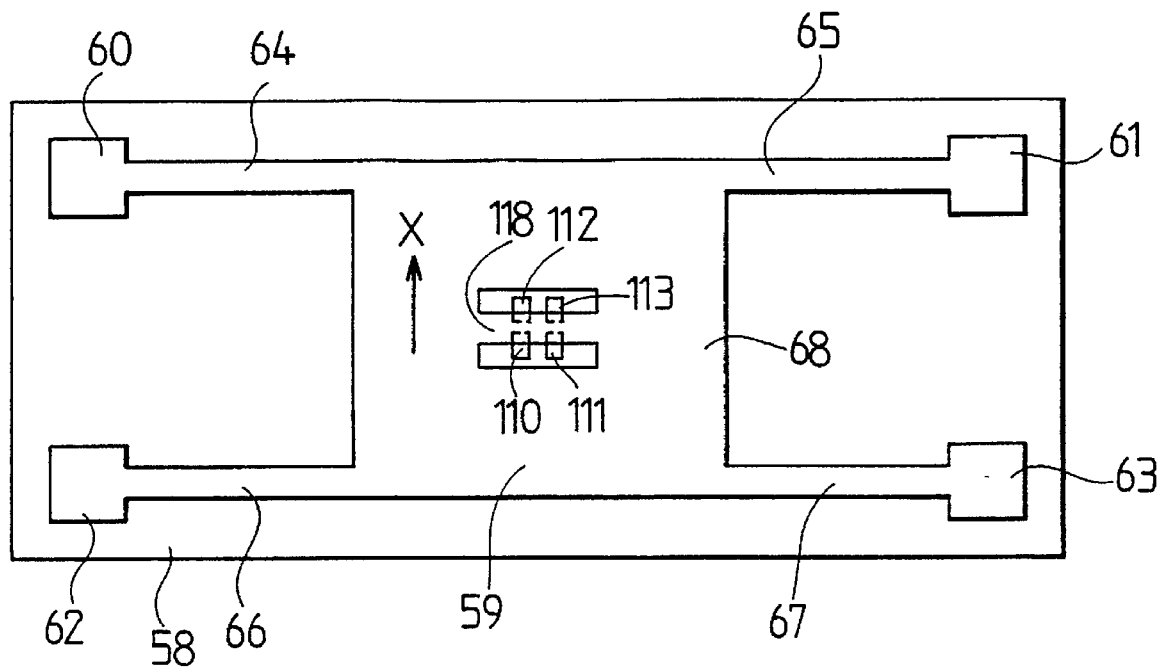
FIG. 16 is a plan view of a semiconductor acceleration sensor according to another example.

FIG. 16 illustrates a sample application. With this structure, a movable gate 118 having a belt configuration is provided at a right angle to the detection direction X with respect to the gouged section of the movable electrode (weight section). Whereas the movable gate was a cantilever type with respect to the weight 68 in the structure illustrated in FIG. 15, according to the present structure, it has a doubly supported structure with respect to the weight 68. According to this embodiment as well, it is possible to dispose both transistors proximate to one another.

Fourth Embodiment

Figure 17:
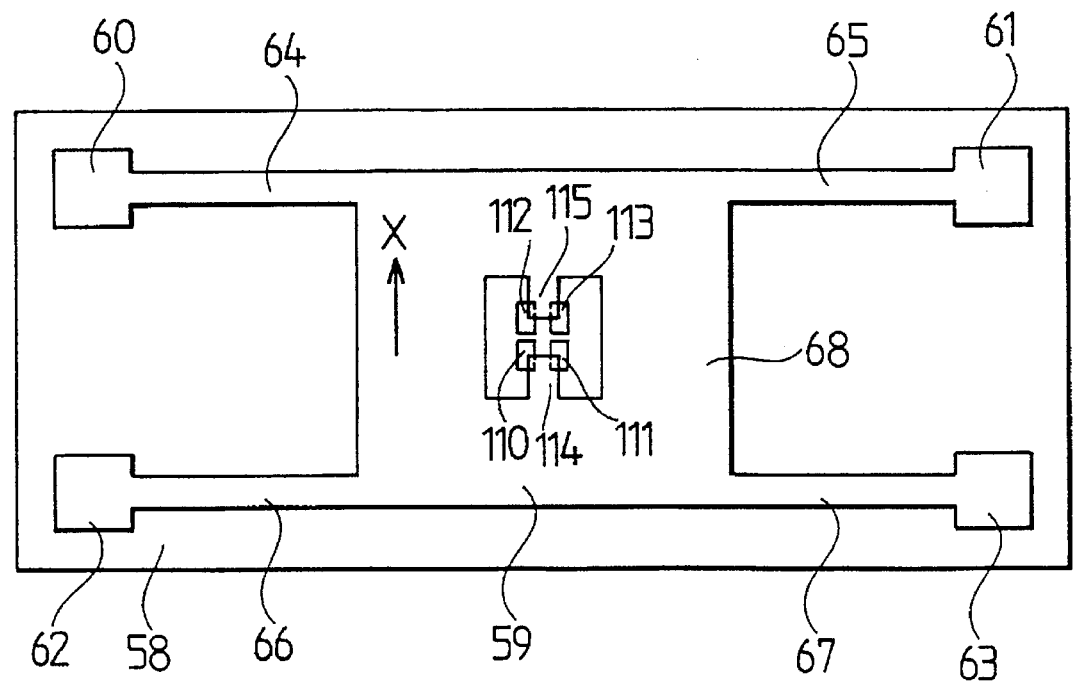
FIG. 17 is a plan view of a semiconductor acceleration sensor according to a fourth embodiment.

FIG. 17 is a plan view of a semiconductor acceleration sensor according to a fourth embodiment of the present invention.

According to this embodiment, movable gates 114 and 115 protrude from the gouged sections of the movable section (weight section). Additionally, the gate electrodes 114 and 115 protrude from two end surfaces which oppose each other in the acceleration detection direction X on the respective gouged sections. Acceleration detection operation as a semiconductor acceleration sensor is similar to the first and second embodiments described above.

According to this embodiment as well, the two transistors can be disposed proximate to one another, and similar to the first through third embodiments, fluctuation differences in characteristics between the two transistors can be suppressed.

Figure 18:
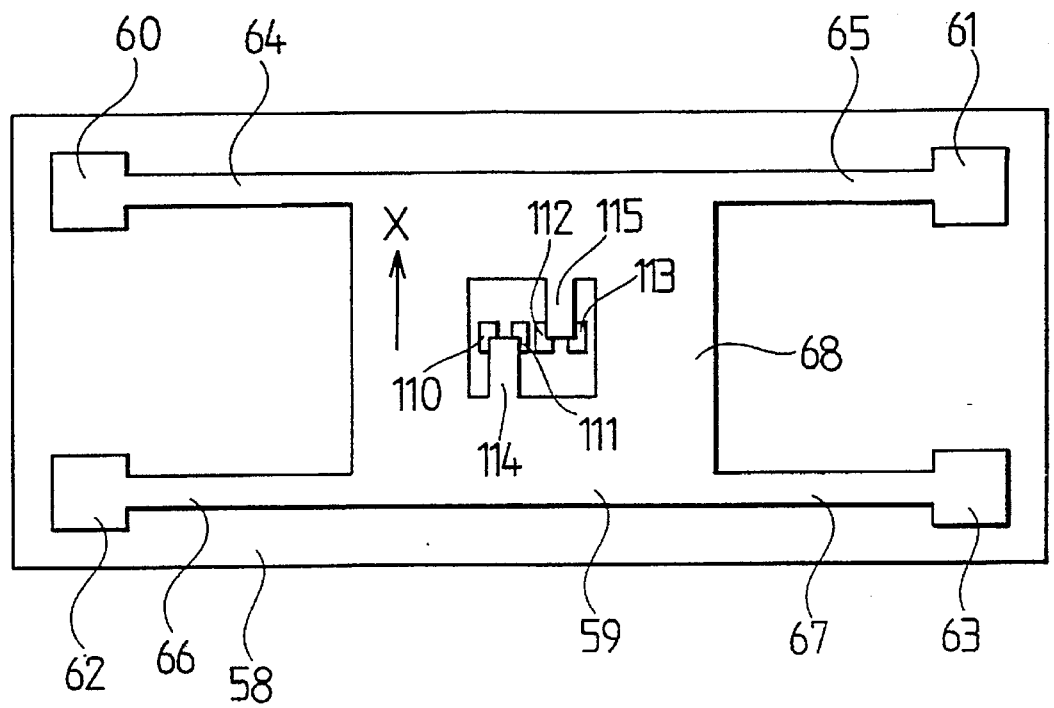
FIGS. 18 and 19 are plan views of a semiconductor acceleration sensor according to another example.
Figure 19:
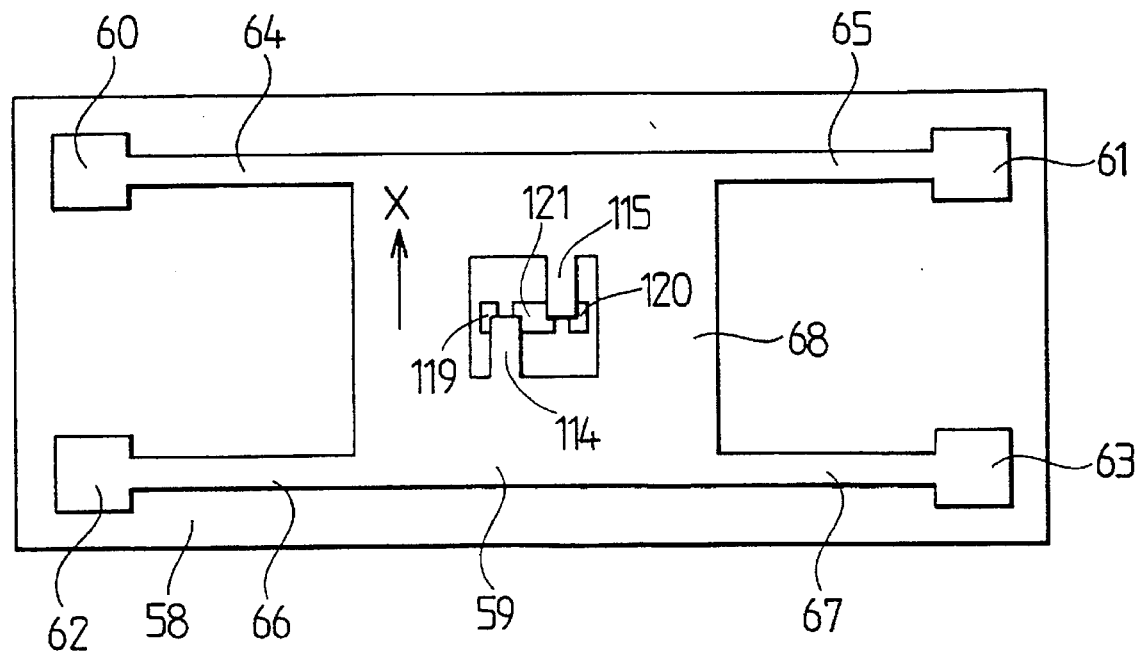

FIGS. 18 and 19 indicate sample applications.

In the sample application of FIG. 18, the fixed electrodes 110, 111, 112, and 113 are disposed in a perpendicular direction with respect to the acceleration detection direction X, such that they form a straight line. In accordance with this, the movable electrodes 114 and 115 are parallel to the direction X, and moreover, the lengthwise axes thereof are all disposed within the gouged section of the movable section (weight section) 68. According to this embodiment as well, the two transistors can be disposed proximate to one another. In addition, FIG. 19 indicates an example where the electrodes 111 and 112 of fixed electrodes 110 to 113 of FIG. 18 are made common to become fixed electrodes 119 to 121.

Another example of bridges 23 as movable-range restriction members in the foregoing first embodiment will be described next.

According to the first embodiment, bridges 23 which are movable-range restriction members are disposed on the respective four beam sections, but the configuration, structural location, number, and the like of the bridges can be varied as desired, and for example may be made to be at only two areas as shown in FIG. 20, or may be structured to cover the entirety of the weight section 12 as shown in FIG. 21.

Figure 23:
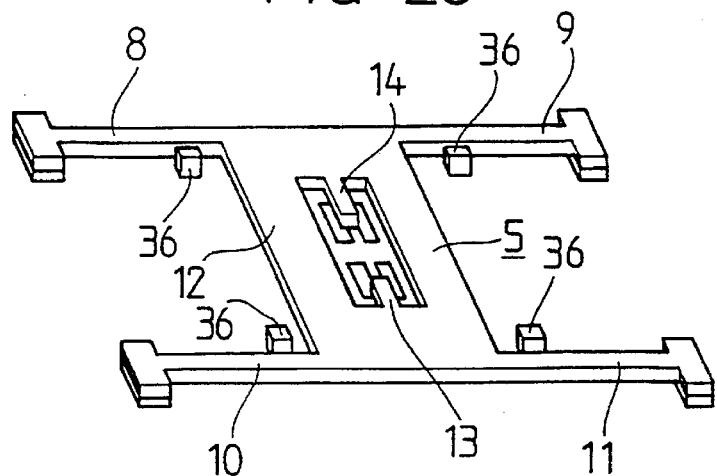
Figure 24:
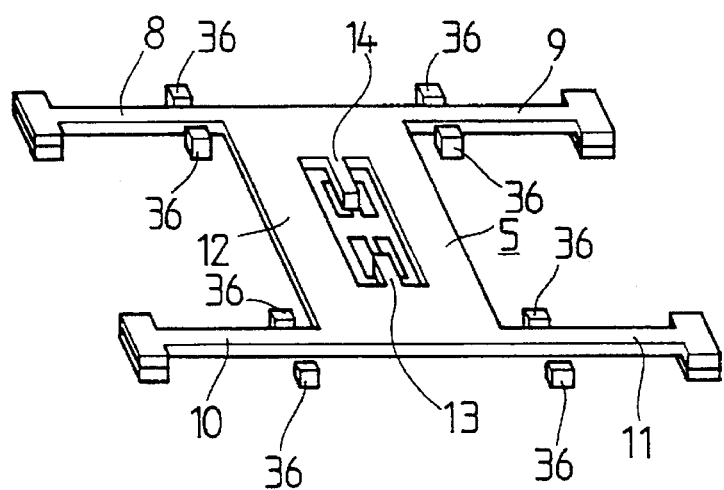
Figure 25:
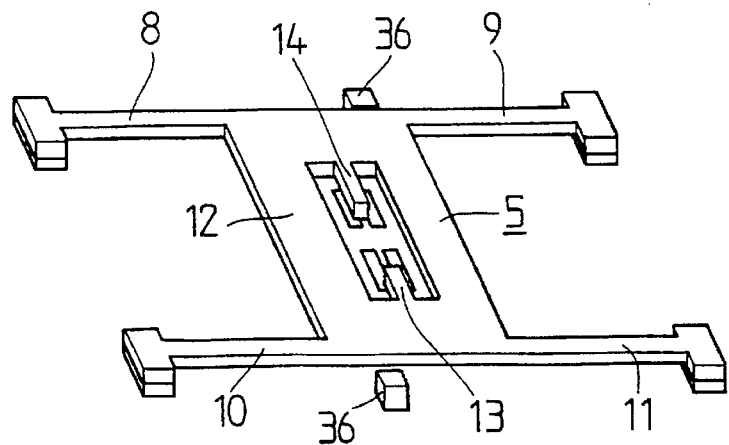
Figure 22:
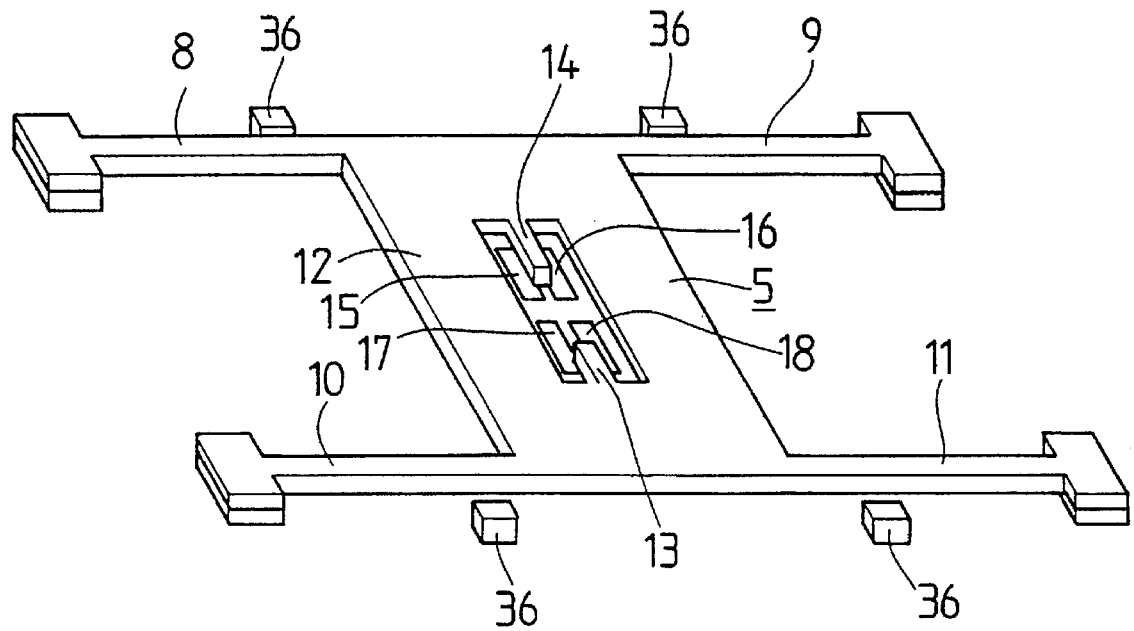

Additionally, as shown in FIG. 22, it is acceptable to install beam sections 8 to 11 of a movable section 5 and side stoppers 36 (movable-range restriction members) above a p-type silicon substrate 1 with a predetermined gap interposed therebetween. These side stoppers 36 are composed of aluminum or polycrystalline silicon, and can be formed simultaneously with the aluminum lead or beam sections. In this manner, the movable range of the movable section 5 can be restricted by means of providing side stoppers 36. Consequently, even if a large force (acceleration) is applied suddenly in a direction parallel to the substrate surface with respect to the movable section 5, there is no breakage or bending of the beam sections 8 to 11. Accordingly, durability is excellent, and accurate acceleration detection which is constantly stabilized can be performed. In addition, because the side stoppers 36 are formed simultaneously in the process to form the aluminum lead or polycrystalline silicon beam, there is no need to add a special step for the purpose of forming the side stoppers 36. Moreover, in FIG. 22, the side stoppers 36 are formed at the rate of one each at the outer proximity of the respective four beam sections (total of four), but it is acceptable to vary the locations and number to be formed as desired, and for example one each may be disposed at the inner proximity of the four beam sections 8, 9, 10, and 11 (total of four) as shown in FIG. 23, or one each may be disposed at the outer and inner proximities of the four beam sections 8, 9, 10, and 11 (total of eight) as shown in FIG. 24, or one each may be disposed in the displacement directions of the movable section 5 (total of two) as shown in FIG. 25.

Figure 26:
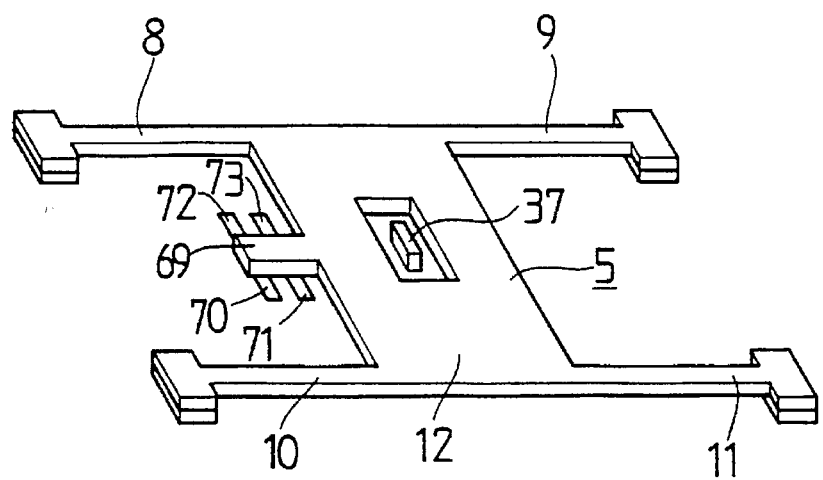

Furthermore, similar effects can be obtained even if a center stopper 37 is caused to be formed in the interior of the weight section 12 as shown in FIG. 26.

Fifth Embodiment

Next, a fifth embodiment will be described focusing on points of difference from the first embodiment.

Figure 27:
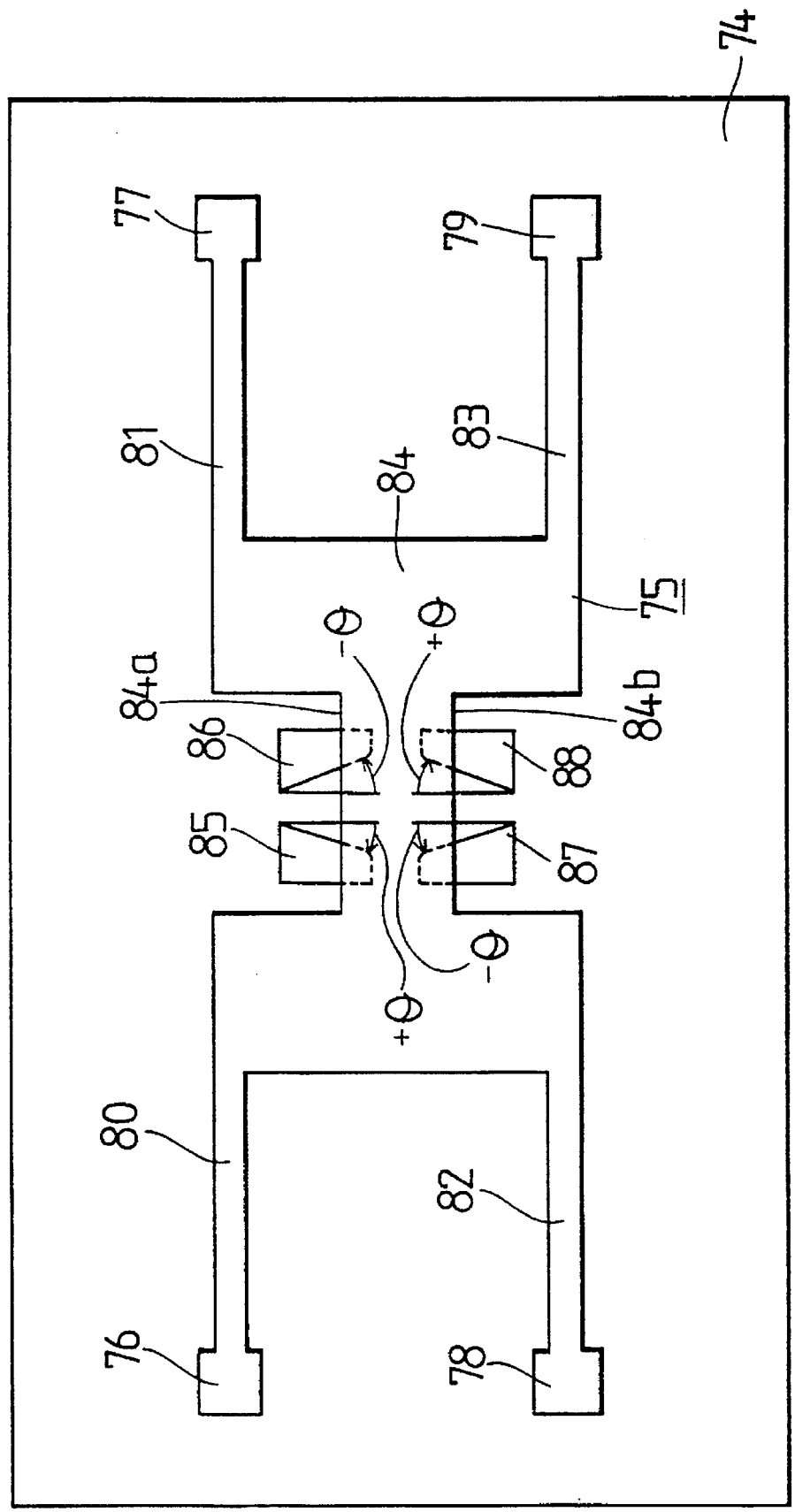
FIG. 27 is a plan view of a semiconductor acceleration sensor according to a fifth embodiment.

FIG. 27 indicates a plan view of a semiconductor acceleration sensor according to this embodiment.

A movable section 75 is formed on a p-type silicon substrate 74 as a semiconductor substrate. The movable section 75 is composed of anchor sections 76, 77, 78, and 79, beam sections 80, 81, 82, and 83, a weight section 84, the center portion of which is of narrowed width as a gate electrode. The anchor sections 76, 77, 78, and 79 protrude upwardly from the silicon substrate 74, and the beam sections 80, 81, 82, and 83 extend from the anchor sections 76, 77, 78, and 79. The weight section 84, the center portion of which is of narrowed width, is supported by beam sections 80, 81, 82, and 83. The movable section 75 is disposed above the silicon substrate 74 with a predetermined gap interposed therebetween, and the weight section 84 is doubly supported by means of the beam sections 80, 81, 82, and 83. In FIG. 27, the direction indicated by X ($X_+$ on the positive side and $X_-$ on the negative side) becomes the displacement direction of the movable section 75 parallel to the substrate surface, that is, the acceleration detection direction.

Meanwhile, fixed electrodes 85 and 86, as a first source/drain region composed of an n-type impurity diffusion region, are aligned in a direction at right angles to the acceleration detection direction X on the silicon substrate 74 below an end surface 84a of the weight section 84. Additionally, fixed electrodes 87 and 88, as a second source/drain region composed of an n-type impurity diffusion region, are aligned in a direction at right angles to the acceleration detection direction X on the silicon substrate 74 below another end surface 84b of the weight section 84. The distance (channel length) between the fixed electrodes 85 and 86 is changed in the direction at a right angle to the displacement direction (acceleration detection direction X) of the weight section 84. Also, the distance (channel length) between the fixed electrodes 87 and 88 is changed in the direction at a right angle to the displacement direction (acceleration detection direction X) of the weight section 84. That is to say, the edge of the fixed electrode 85 opposing the fixed electrode 86 is formed with a tilt corresponding to a predetermined angle +q (the clockwise direction is indicate by "+" and the counterclockwise direction is indicated by "−") with respect to the acceleration detection direction X, and the edge of the fixed electrode 86 opposing the fixed electrode 85 is formed with a tilt corresponding to a predetermined angle −q with respect to the acceleration detection direction X. Additionally, the edge of the fixed electrode 87 opposing the fixed electrode 88 is formed with a tilt corresponding to a predetermined angle −q with respect to the acceleration detection direction X, and the edge of the fixed electrode 88 opposing the fixed electrode 87 is formed with a tilt corresponding to a predetermined angle +q with respect to the acceleration detection direction X.

Operation of this semiconductor acceleration sensor will be described next utilizing FIGS. 28 and 29A–29C.

Figure 30:
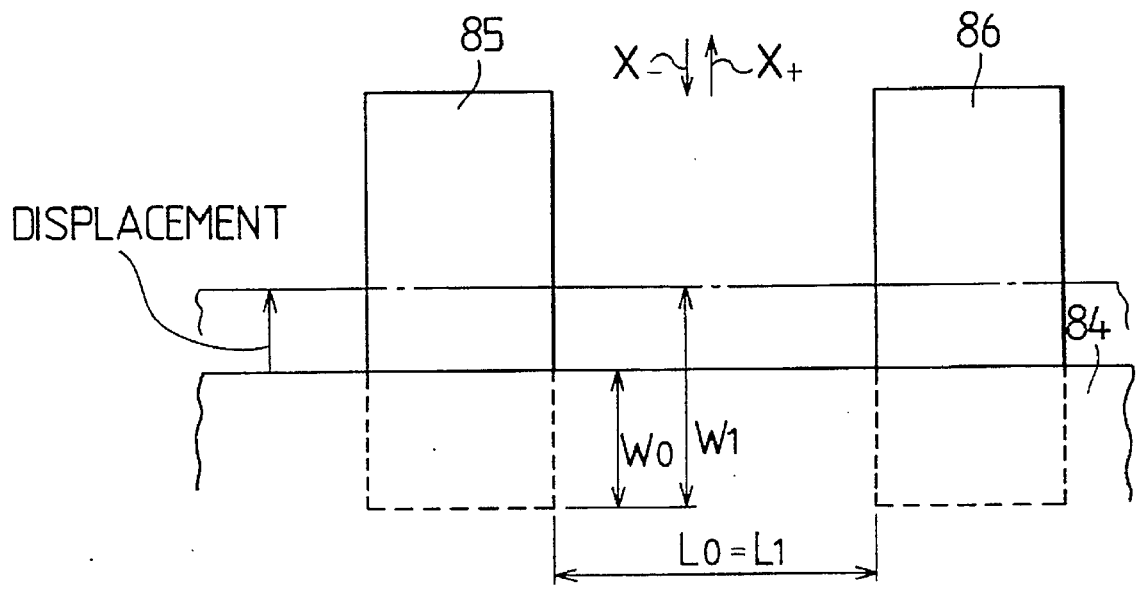
FIG. 30 is an enlarged view of a semiconductor acceleration sensor according to a comparative example.

As indicated by the solid lines in FIG. 28, when the weight section 84 (movable gate electrode) is not subjected to acceleration and is not displaced, channel width $W=W_0$ and channel length $L=L_0$. When the weight section 84 (movable gate electrode) is displaced in the positive-side acceleration detection direction $X_+$, channel width $W=W_1$ and channel length $L=L_1$. That is to say, $W_0<W_1$ and $L_0>L_1$. Herein, because the amount of change in channel width is given by $W_1-W_0$, and the relationship of drain current $I_d=A \times W/L$ exists, the amount of change in drain current is expressed by $DI_{d1}=A \times (W_1-W_0)/L_1$. However, A is a constant. In contrast to this, in a case where the interval between fixed electrodes 85 and 86 is made equidistant as shown in FIG. 30, channel length does not change even if the weight section 84 (movable gate electrode) is displaced, and so the drain current change due to the same amount of displacement is $DI_{d1}'=A \times (W_1-W_0)/L_0$, and consequently, because $L_1<L_0$, $DI_{d1}>DI_{d1}'$. That is to say, for the same displacement amount of the weight section 84 (movable gate electrode), this embodiment can obtain a large drain current change compared with the structure indicated in FIG. 30. Consequently, higher sensitivity becomes possible even when the size of the movable section 75 (weight section, beam width, and so on) is the same. Stated in another way, if the interval of the fixed electrodes is uniform as shown in FIG. 30, the displacement determination is only based on amount of increase or decrease of the channel width which is equal to the displacement amount. Therefore, a large displacement of the weight section 84 (movable gate electrode) becomes necessary in order to obtain a large change in drain current, and for this reason the mass of the movable section 75 is made large, which becomes an impediment to compactness (such as making the beams thin) and to simplification of the fabrication process. According to this embodiment, however, the change in drain current becomes large, and so utility for compactness exists. Moreover, if applied to a servo-type detection circuit, the displacement required for servo-control can be reduced and signal detection accuracy can be improved.

Figure 31:
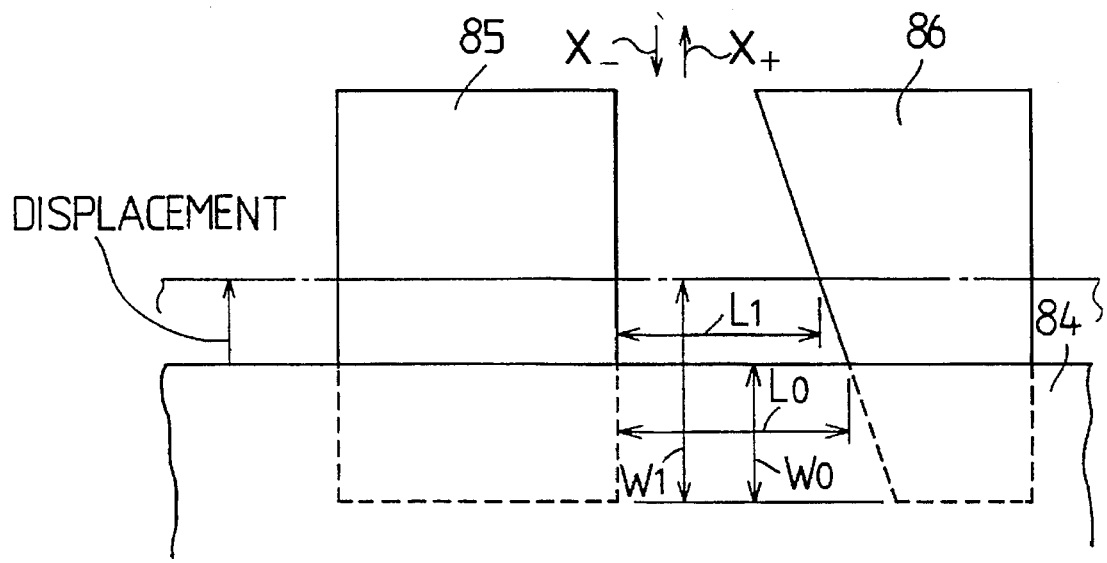
FIG. 31 is an enlarged view of a semiconductor acceleration sensor according to another example of the fifth embodiment.

As a sample application according to this embodiment, it is also acceptable to form only one or the other of the two fixed electrodes in a diagonal configuration, as is shown in FIG. 31.

Sixth Embodiment

Next, a sixth embodiment will be described with a focus on points of difference from the first embodiment.

Figure 33:
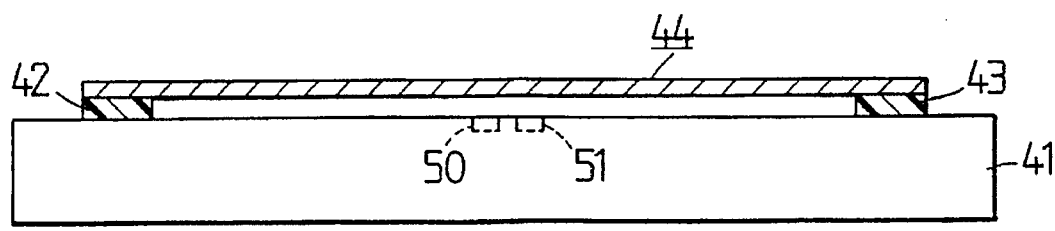
FIG. 33 is a sectional view taken along line 33—33 of FIG. 32.
Figure 34:
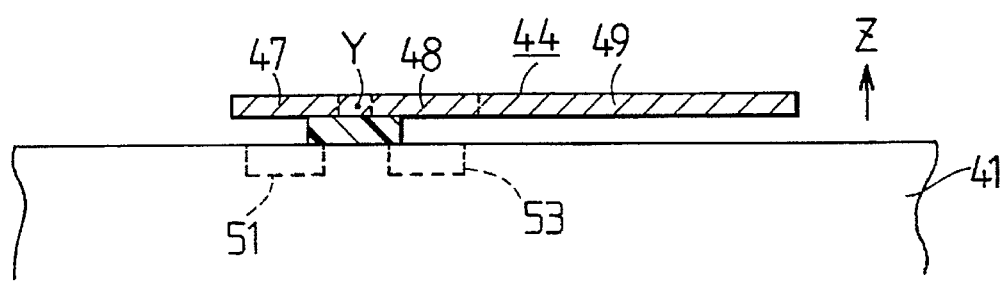
FIG. 34 is a sectional view taken along line 34—34 of FIG. 32.

FIG. 32 indicates a plan view of a semiconductor acceleration sensor according to this embodiment. In addition, FIG. 33 illustrates a sectional view of FIG. 32 taken along line 33—33, and FIG. 34 illustrates a sectional view taken along line 34—34 of FIG. 32.

Silicon oxide films 42 and 43 are disposed separately on a p-type silicon substrate 41 as a semiconductor substrate, and the movable section 44 is suspended above these silicon oxide films 42 and 43. The movable section 44 is composed of a beam section 45 as a doubly supported type beam, a movable electrode section 47 as a first gate electrode section, a movable electrode section 48 as a second gate electrode section, and a weight section 49, and the movable section 44 is disposed above the silicon substrate 41 with a predetermined gap interposed therebetween. The beam section 45 having a uniform width and extending linearly is suspended over the silicon oxide films 42 and 43, and the movable electrode sections 47 and 48 of an oblong configuration in the direction at a right angle to the axis Y of the beam section 45 protrude in mutually opposite directions from the center section of the beam section 45. Additionally, the weight section 49 is formed on the end section of the movable electrode section 48.

In this manner, the center of gravity of the movable section 44 is shifted from the axis Y of the beam section 45 by means of the weight section 49. Accordingly, the movable section 44 is such that it can be displaced in a direction perpendicular to the surface of the silicon substrate 41.

Meanwhile, fixed electrodes 50 and 51, as a first source/drain region composed of an n-type impurity diffusion region, are formed at both sides thereof with respect to the movable electrode section 47 on the silicon substrate 41 below the movable electrode section 47 of the movable section 44. Accordingly, the current flowing between the movable electrodes 50 and 51 changes due to a change in the distance with the movable electrode section 47. Similarly, fixed electrodes 52 and 53, as a second source/drain region composed of an n-type impurity diffusion region, are formed at both sides thereof with respect to the movable electrode section 48 on the silicon substrate 41 below the movable electrode section 48 of the movable section 44. Accordingly, the current flowing between the movable electrodes 52 and 53 changes due to change in the distance with the movable electrode section 48.

Operation of this semiconductor acceleration sensor will be described next.

Figure 35:
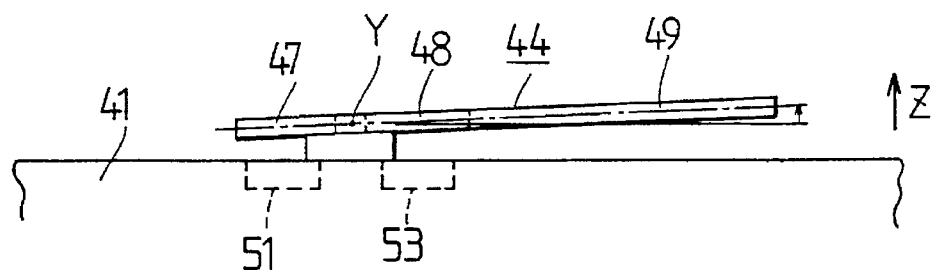
FIG. 35 is a view employed to describe the operation of the sixth embodiment.
Figure 37:
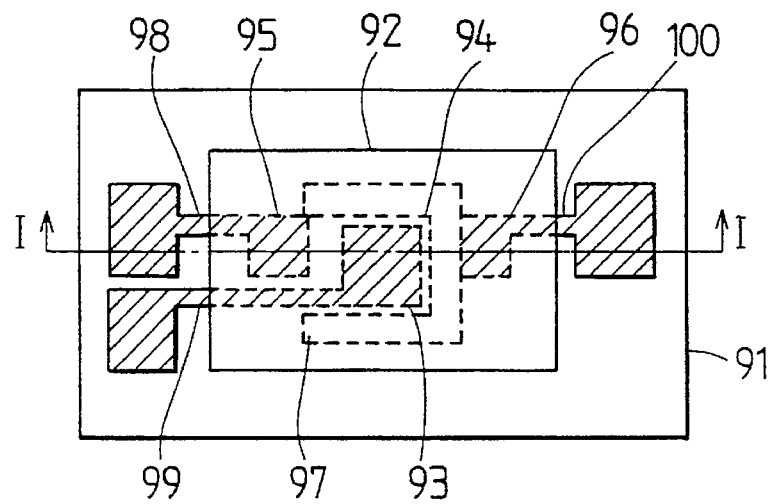
FIG. 37 is a plan view of a conventional semiconductor acceleration sensor.
Figure 38:
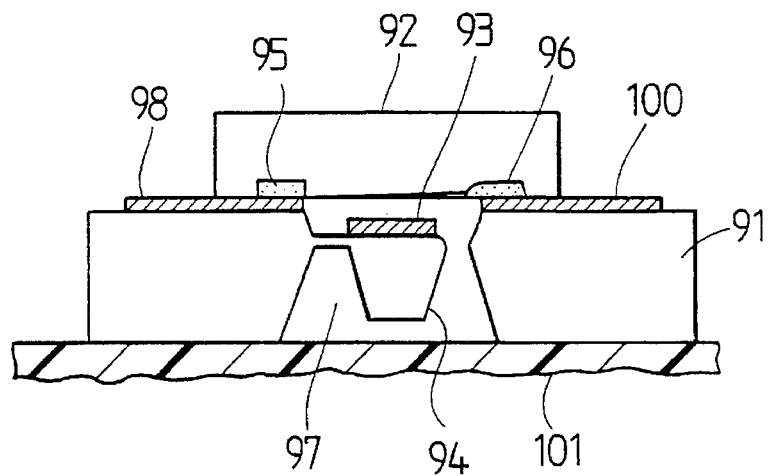
FIG. 38 is a sectional view taken along line 38—38 of FIG. 37.

When this acceleration sensor is subjected to acceleration in the Z direction indicated in FIG. 34 (i.e., the direction perpendicular to the surface of the substrate 41), the center of gravity of the movable section 44 is shifted from the axis Y of the beam section 45, and so twisting is generated with respect to the axis Y of the beam section 45. As a result of this, as shown in FIG. 35, the movable electrode section 47 moves so as to approach the silicon substrate 41, and the movable electrode section 48 moves so as to separate from the silicon substrate 41. As a result of this, the carrier concentration of the channel region between the fixed electrodes 50 and 51 increases, and so the current flowing through the channel region also increases; meanwhile, the carrier concentration of the channel region between the fixed electrodes 52 and 53 decreases, and so the current flowing through the channel region also decreases. In this manner, when acceleration is received in the Z direction indicated in FIG. 34 (i.e., the direction perpendicular to the surface of the substrate 41), the distances between the movable electrode sections 47 and 48 and the silicon substrate 41 change in reverse phase, and the currents flowing through the fixed electrodes 50 and 51 and also through the fixed electrodes 52 and 53 change in reverse phase.

This current between the fixed electrodes 50 and 51 and current between the fixed electrodes 52 and 53 are detected as differentials by a differential circuit. In this manner, according to this embodiment, even acceleration of a normal-line direction with respect to the substrate can be detected by a differential circuit, and so detection accuracy is improved.

Additionally, the two transistors for detection use for the purpose of detection by a differential type can also be disposed proximately to the axis Y, and similarly to the various embodiments described above, fluctuation differences between both transistors can be made so small as to be negligible.

Figure 36:
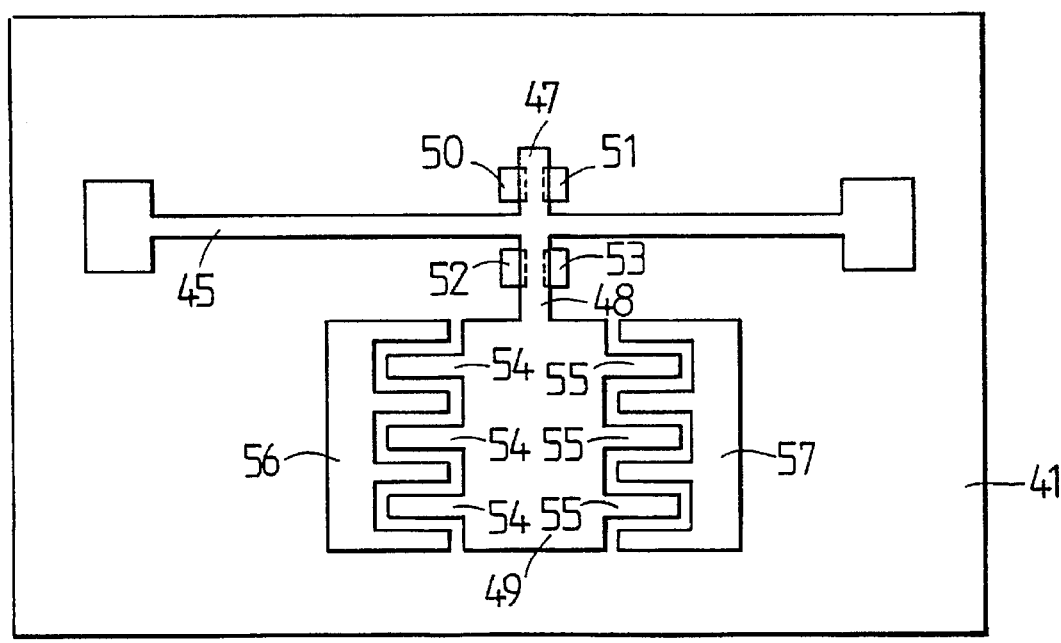
FIG. 36 is a plan view of a semiconductor acceleration sensor according to another example.

FIG. 36 indicates a sample application according to this embodiment. According to this embodiment, acceleration detection is performed by means of closed-loop (servo) control. Electrodes for servo use 54 and 55 extending in parallel protrude from the weight section 49 with a predetermined gap interposed mutually therebetween. Additionally, opposing electrodes for servo use 56 and 57 of comb-tooth configuration are disposed opposingly on the top surface of the silicon substrate 41 in a state separated by a predetermined gap with respect to the electrodes for servo use 54 and 55. Accordingly, when the weight section 49 is subjected to an acceleration and attempts to shift in a direction away from the substrate surface and voltage is applied to the opposing electrodes for servo use 56 and 57, force can be exerted to cause the weight section to approach the substrate surface by means of electrostatic force. That is to say, the electrostatic force generated between the opposing electrodes for servo use 56 and 57 and the electrodes for servo use 54 and 55 can be regulated by means of adjusting the voltage applied to the opposing electrodes for servo use 56 and 57. Accordingly, when acceleration perpendicular to the substrate surface is applied, voltage applied to the opposing electrodes for servo use 56 and 57 is adjusted so that the drain current between the fixed electrodes 50 and 51 and the drain current between the fixed electrodes 52 and 53 are equalized. Applied acceleration is detected by means of this voltage applied to the opposing electrodes for servo use 56 and 57.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor acceleration sensor, comprising:
   a semiconductor substrate;
   a movable member supported in a movable state above said semiconductor substrate with a predetermined gap interposed therebetween, a predetermined electrical potential being applied to said movable member with respect to said semiconductor substrate;

a first pair of source and drain diffusion regions disposed on a surface of said semiconductor substrate in correspondence to said movable member; and a second pair of source and drain diffusion regions disposed on a surface of said semiconductor substrate in correspondence to said movable member, said second pair of source and drain diffusion regions being disposed proximate to said first pair of source and drain diffusion regions, wherein a first current flowing through said first pair of source and drain diffusion regions and a second current flowing through said second pair of source and drain diffusion regions change in a mutually reverse phase if said movable member is subjected to an acceleration and is displaced.

2. A semiconductor acceleration sensor according to claim 1, wherein said movable member includes a doubly supported type beam structure.

3. A semiconductor acceleration sensor according to claim 1, further comprising a movable-range restriction member disposed on said substrate to restrict a movable range of said movable member.

4. A semiconductor acceleration sensor according to claim 3, wherein said restriction member is composed of material identical to a lead metal on said semiconductor substrate.

5. A semiconductor acceleration sensor, comprising:

a semiconductor substrate;

a movable section supported by two beam structures and disposed above said semiconductor substrate;

a gate electrode section having a belt configuration disposed on said movable section above said semiconductor substrate with a predetermined gap interposed therebetween, said gate electrode extending in a direction at a right angle with respect to an acceleration detection direction which is parallel to a surface of said semiconductor substrate;

first source and drain regions aligned in a right-angle direction with respect to said acceleration detection direction on said semiconductor substrate below said gate electrode section, each being defined by an impurity diffusion region extending in said acceleration detection direction, wherein a characteristic of current flowing therethrough changes as a result of displacement of said gate electrode section in said acceleration detection direction; and second source and drain regions aligned in said right-angle direction with respect to said acceleration detection direction on said semiconductor substrate below said gate electrode section, each being defined by an impurity diffusion region extending in said acceleration detection direction, wherein current flowing therethrough changes in reverse phase with respect to said current flowing between said first source and drain regions as a result displacement of said gate electrode section in said acceleration detection direction.

6. A semiconductor acceleration sensor, comprising:

a semiconductor substrate;

a movable section doubly supported by two beam structures and disposed above said semiconductor substrate;

first and second movable gate electrode sections disposed at edge portions of a gouged section defined in said movable section, wherein said edge portions of said gouged section mutually oppose one another and lie in a direction parallel to an acceleration detection, which is a direction parallel to a surface of said semiconductor substrate;

first source and drain regions aligned in a right-angle direction with respect to said acceleration detection direction on said semiconductor substrate below said first movable gate electrode section, each being defined by an impurity diffusion region extending in said acceleration detection direction, wherein a characteristic of current flowing therethrough changes as a result of displacement of said first movable gate electrode section in said acceleration detection direction; and second source and drain regions aligned in a right-angle direction with respect to said acceleration detection direction on said semiconductor substrate below said second movable gate electrode section, each being defined by an impurity diffusion region extending in said acceleration detection direction, wherein current flowing therethrough changes in a reverse phase with respect to said current flowing through said first source and drain regions as a result of displacement of said second movable gate electrode section in said acceleration detection direction.

7. A semiconductor acceleration sensor according to claim 6, wherein said first and second movable gate electrode sections are protruding sections protruding respectively from said edge portions of said gouged sections.

8. A semiconductor acceleration sensor, comprising:

a semiconductor substrate;

a gate electrode section supported above said semiconductor substrate by means of a doubly supported type beam section with a predetermined gap interposed therebetween; and source and drain regions each formed of an impurity diffusion region on said semiconductor substrate, aligned in a direction at a right angle to an acceleration detection direction parallel to a surface of said semiconductor substrate, said source and said drains regions being disposed relative to one another such that a distance between said source and drain regions changes in said acceleration detection direction, whereby current flowing between said source and drain regions changes as a result of displacement of said gate electrode section along said acceleration detection direction.

9. A semiconductor acceleration sensor, comprising:

a semiconductor substrate;

a doubly supported type beam section disposed above said semiconductor substrate;

first and second gate electrode sections protruding respectively from both sides of said doubly supported type beam section above said semiconductor substrate with a predetermined gap interposed therebetween wherein, distances of said first and second gate electrodes from said semiconductor substrate vary in mutually reverse phase in response to a first acceleration applied in a direction perpendicular to a surface of said semiconductor substrate;

first source and drain regions each defined by an impurity diffusion region extending in an acceleration detection direction which is parallel to a surface of said substrate, wherein a characteristic of current flowing therethrough changes as a result of a change in distance from said first gate electrode section by means of a second acceleration; and second source and drain regions each detected by an impurity diffusion region extending in said second acceleration detection direction, wherein a characteristic of current flowing therethrough changes as a result of a change in distance from said second gate electrode section by means of said second acceleration.

10. A semiconductor acceleration sensor according to claim 1, wherein said movable member includes two doubly supported type beam structures and is anchored to four anchor portions of said semiconductor substrate via said doubly supported type beam structures.

11. A semiconductor acceleration sensor according to claim 10, wherein said first source and drain diffusion regions and said second source and drain regions are located inside a four-sided configuration defined by said four anchor portions.

12. A semiconductor acceleration sensor according to claim 7, wherein said protruding sections protrude from said edge portions of said gouged sections at positions mutually shifted in a right-angle direction with respect to said acceleration detection direction, respectively.

13. A semiconductor acceleration sensor according to claim 8, wherein said distance between said source and drain regions changes gradually in said acceleration detection direction.

14. A semiconductor acceleration sensor according to claim 13, wherein at least one of said source and drain regions has a boundary line oblique to said acceleration detection direction such that said distance between said source and drain regions varies gradually in said acceleration detection direction.

* * * * *